US010944619B2

(12) United States Patent
Hakata et al.

(10) Patent No.: US 10,944,619 B2
(45) Date of Patent: *Mar. 9, 2021

(54) COMMUNICATION TERMINAL, IMAGE COMMUNICATION SYSTEM, AND DISPLAY CONTROL METHOD

(71) Applicant: Ricoh Company, Ltd., Tokyo (JP)

(72) Inventors: Mayu Hakata, Kanagawa (JP); Kenichiro Morita, Tokyo (JP); Takafumi Takeda, Tokyo (JP); Hidekuni Annaka, Saitama (JP); Takeshi Homma, Kanagawa (JP); Yohhei Ohmura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,103

(22) Filed: Apr. 10, 2020

(65) Prior Publication Data

US 2020/0244510 A1 Jul. 30, 2020

Related U.S. Application Data

(63) Continuation of application No. 16/352,896, filed on Mar. 14, 2019, now Pat. No. 10,623,231.

(30) Foreign Application Priority Data

Mar. 29, 2018 (JP) .............................. JP2018-065988

(51) Int. Cl.
*H04N 7/14* (2006.01)
*H04L 29/06* (2006.01)
*H04N 5/232* (2006.01)

(52) U.S. Cl.
CPC ...... *H04L 29/06414* (2013.01); *H04L 65/403* (2013.01); *H04N 5/23206* (2013.01); *H04N 5/23238* (2013.01); *H04N 7/147* (2013.01)

(58) Field of Classification Search
CPC ........................................................ H04N 7/14
See application file for complete search history.

(56) References Cited

U.S. PATENT DOCUMENTS 9,807,342 B2 10/2017 Fogarty et al.
2015/0029294 A1 1/2015 Lin et al.
(Continued)

FOREIGN PATENT DOCUMENTS

JP 2011-223076 11/2011
JP 2012-156820 8/2012
(Continued)

OTHER PUBLICATIONS

U.S. Appl. No. 16/103,344, filed Aug. 14, 2018, Mayu Hakata, et al.
(Continued)

*Primary Examiner* — Olisa Anwah
(74) *Attorney, Agent, or Firm* — Xsensus LLP

(57) ABSTRACT

A communication terminal includes circuitry. The circuitry receives data of a whole image, data of a material image, and superimposition position information indicating a position where the material image is to be superimposed on the whole image, the data of the whole image, the data of the material image, and the superimposition position information being transmitted from another communication terminal. The circuitry superimposes the material image on the whole image at the position indicated by the superimposition position information. The circuitry causes a display to display a predetermined-area image, which is an image of a predetermined area of the whole image. When at least a part of the material image being superimposed is not displayed in the predetermined-area image, the circuitry changes the position where the material image is superimposed such that the material image is displayed at a predetermined position in the predetermined-area image.

6 Claims, 36 Drawing Sheets

(56) References Cited

U.S. PATENT DOCUMENTS

| | | |
|---|---|---|
| 2015/0271446 A1 | 9/2015 | Browne et al. |
| 2018/0097682 A1 | 4/2018 | Yoshida et al. |
| 2018/0098105 A1 | 4/2018 | Morita et al. |
| 2018/0191787 A1 | 7/2018 | Morita et al. |
| 2018/0227457 A1 | 8/2018 | Morita et al. |

FOREIGN PATENT DOCUMENTS

| | | |
|---|---|---|
| JP | 2012-178135 | 9/2012 |
| JP | 2018-129716 | 8/2018 |

OTHER PUBLICATIONS

U.S. Appl. No. 16/131,373, filed Sep. 14, 2018, Takuya Soneda, et al.

U.S. Appl. No. 16/140,945, filed Sep. 25, 2018, Yohhei Ohmura, et al.

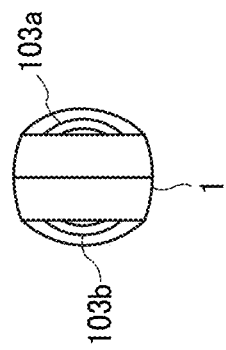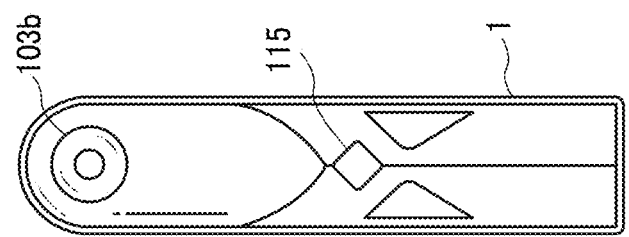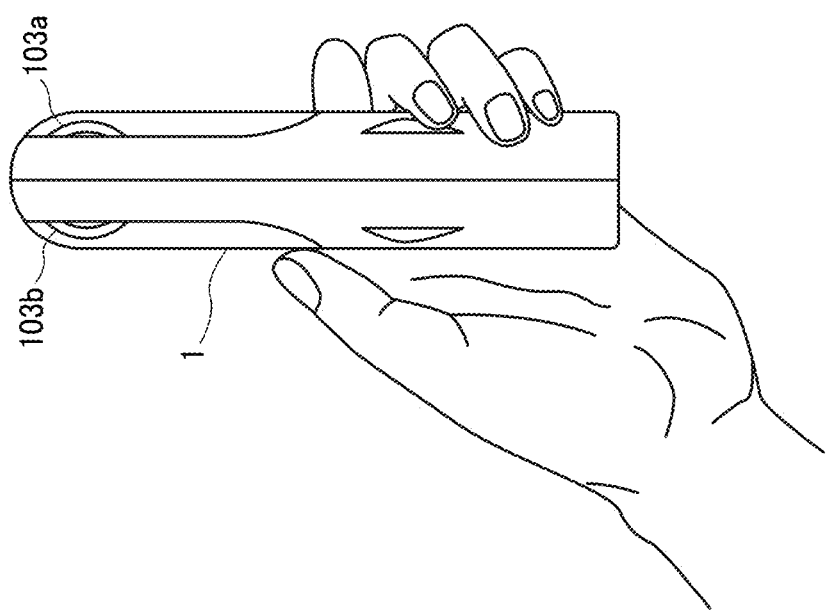

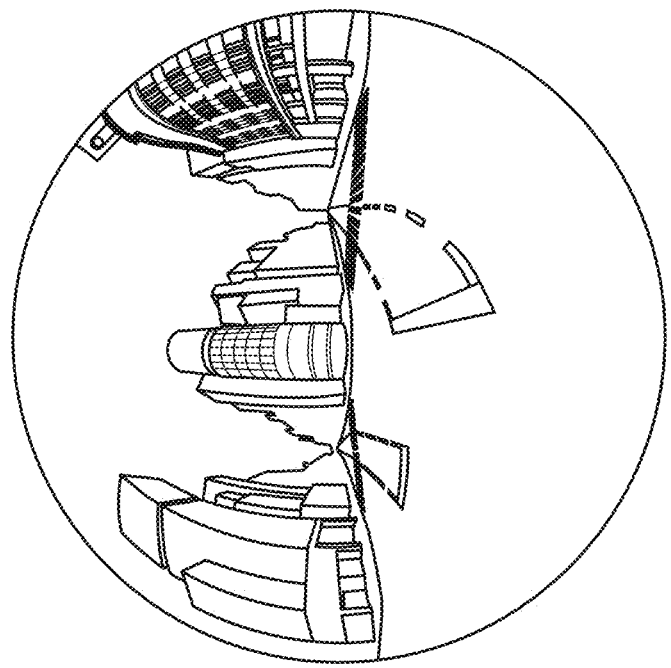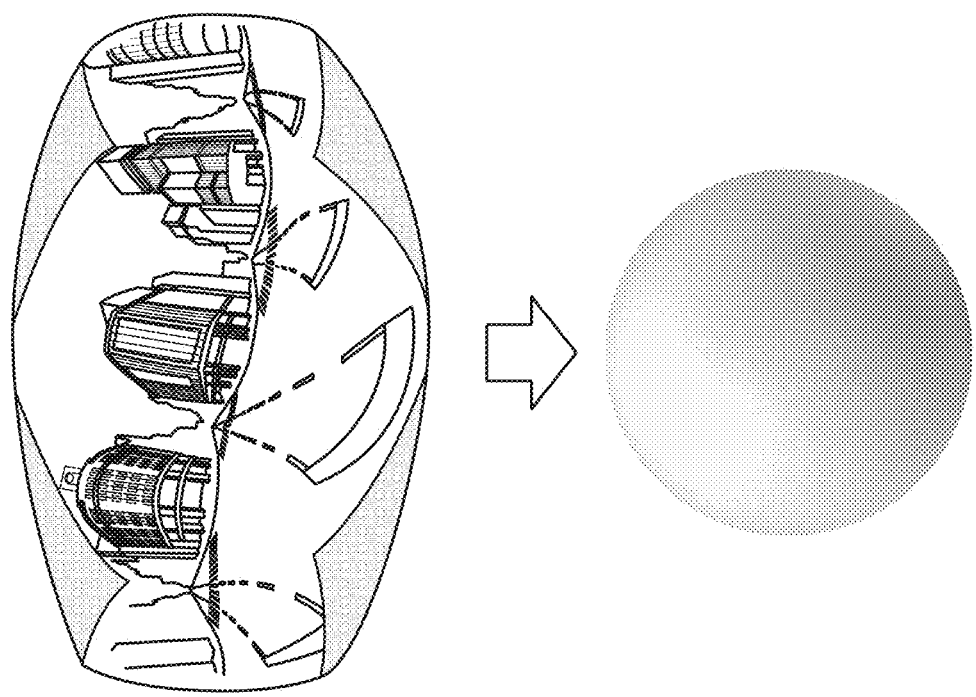

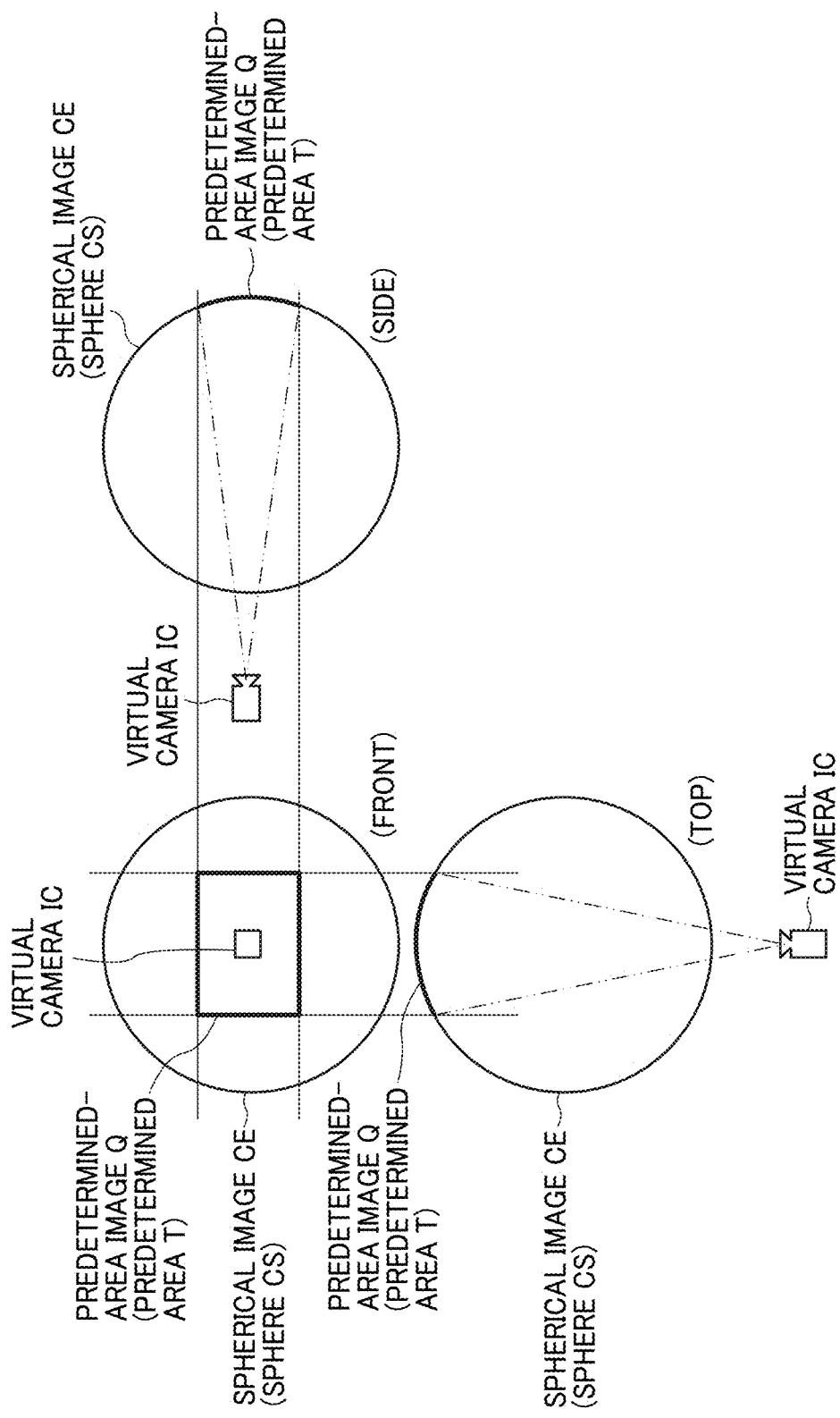

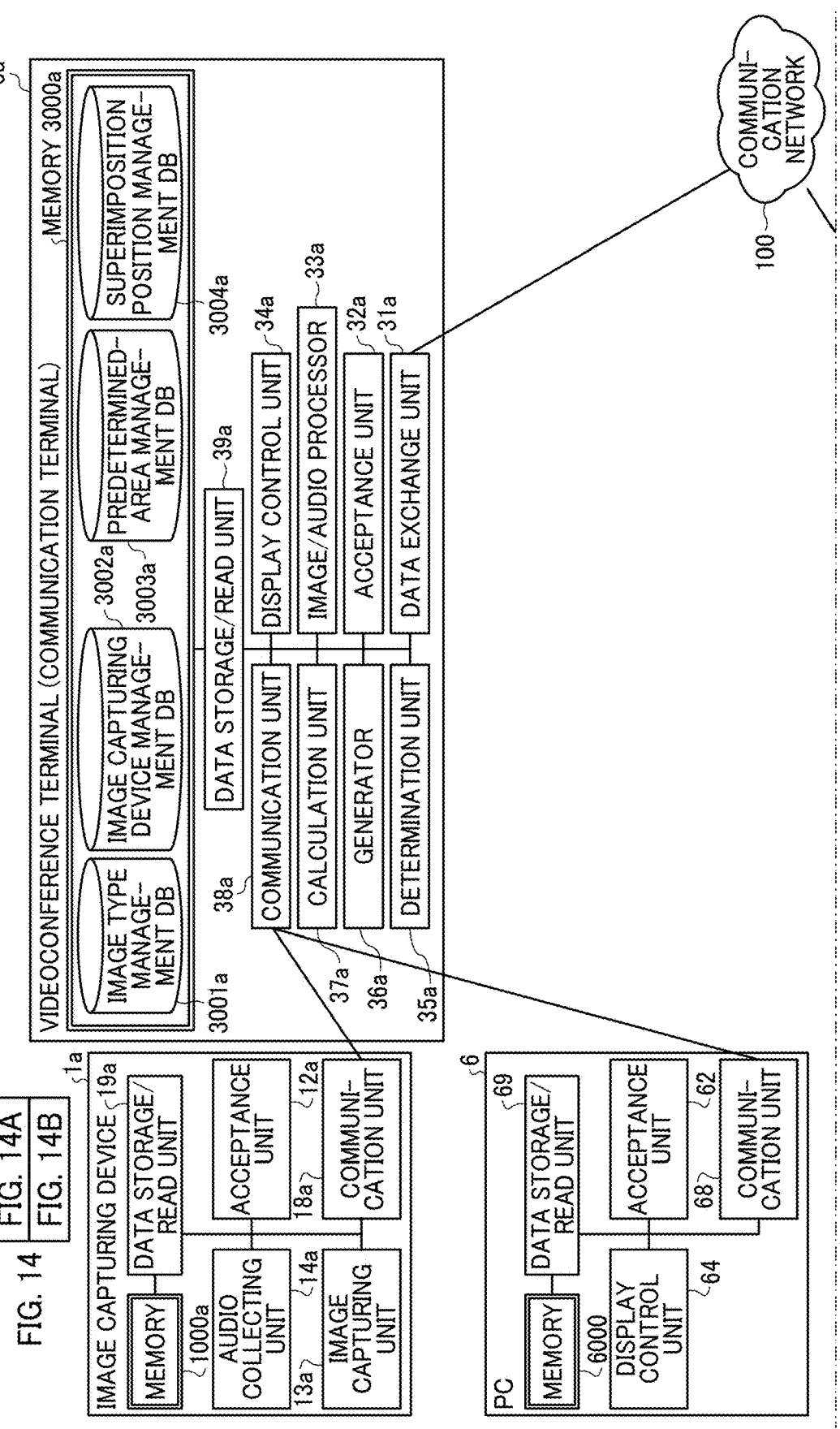

FIG. 16

IMAGE TYPE MANAGEMENT TABLE

| IMAGE DATA ID | IP ADDRESS OF SENDER TERMINAL | SOURCE NAME (IMAGE TYPE INFORMATION) |
|---|---|---|
| RS001 | 1.2.1.3 | Video_Theta |
| RS002 | 1.2.2.3 | Video_Theta |
| RS003 | 1.3.1.3 | Video |
| RS004 | 1.3.2.3 | Video |

FIG. 17

IMAGE CAPTURING DEVICE MANAGEMENT TABLE

| VENDER ID AND PRODUCT ID OF GUID OF IMAGE CAPTURING DEVICE |
|---|
| vid_05ca&pid_2711 |
| vid_05ca&pid_3822 |
| ... |

FIG. 18

PREDETERMINED-AREA MANAGEMENT TABLE

| IP ADDRESS OF SENDER TERMINAL THAT SENDS IMAGE DATA | IP ADDRESS OF DESTINATION TERMINAL THAT RECEIVES IMAGE DATA (IP ADDRESS OF SENDER TERMINAL THAT SENDS PREDETERMINED-AREA INFORMATION) | PREDETERMINED-AREA INFORMATION | | |
|---|---|---|---|---|
| | | MOVING RADIUS (r) | POLAR ANGLE (θ) | AZIMUTH (φ) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | 30 | 40 | 50 |
| 1.2.2.3 | 1.2.1.3 | ... | ... | ... |
| 1.2.2.3 | 1.3.1.3 | ... | ... | ... |
| 1.2.2.3 | 1.3.2.3 | ... | ... | ... |

FIG. 19

SUPERIMPOSITION POSITION MANAGEMENT TABLE

| IP ADDRESS OF SENDER TERMINAL | START POINT COORDINATE | END POINT COORDINATE |
|---|---|---|
| 1.2.1.3 | (200, 100) | (840, 580) |
| 1.2.2.3 | (300, 200) | (940, 680) |
| ... | ... | ... |

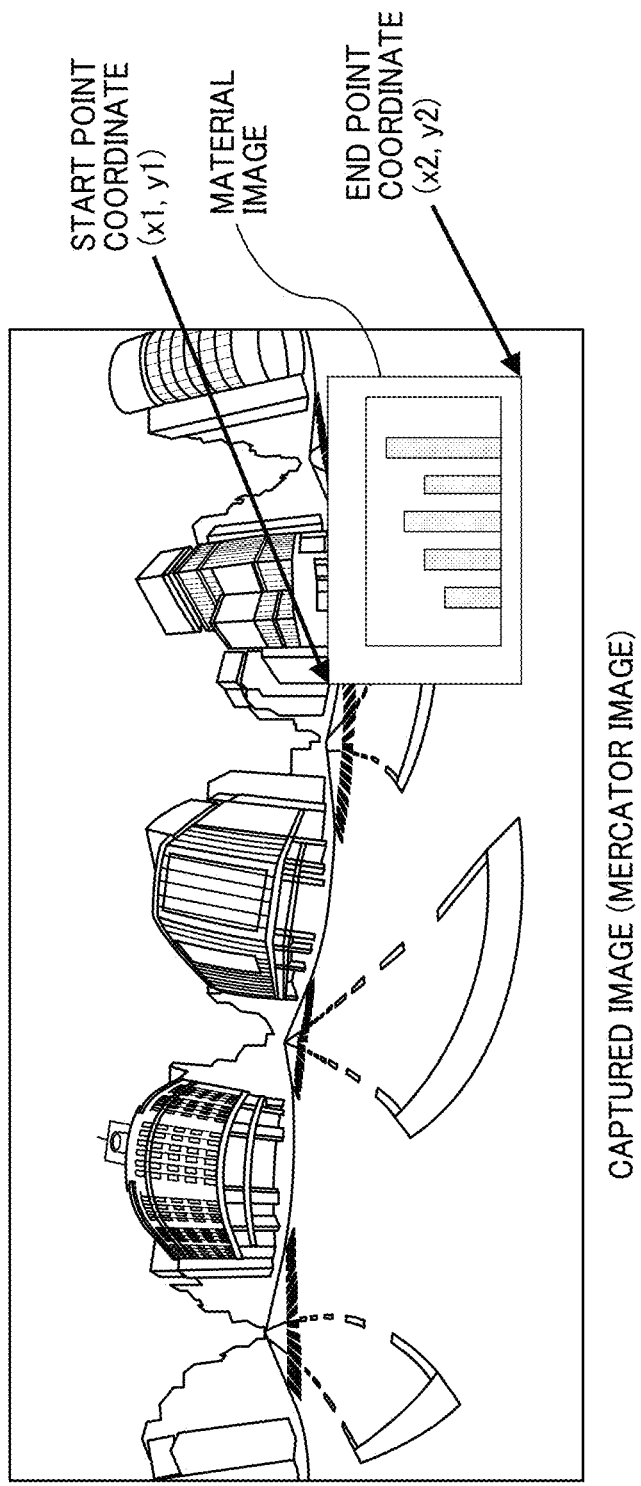

FIG. 21

SESSION MANAGEMENT TABLE

| SESSION ID | IP ADDRESS OF PARTICIPATING TERMINAL |
|---|---|
| se101 | 1.2.1.3, 1.2.2.3, 1.3.1.3 |
| se102 | 1.2.1.3, 1.2.2.3, 1.3.1.3 |
| ... | ... |

FIG. 22

IMAGE TYPE MANAGEMENT TABLE

| SESSION ID | IMAGE DATA ID | IP ADDRESS OF SENDER TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video |
| se101 | RS003 | 1.3.1.3 | Video_Theta |
| se102 | RS004 | 1.2.1.4 | Video |
| se102 | RS005 | 1.3.1.4 | Video_Theta |
| ... | ... | ... | ... |

FIG. 23

PREDETERMINED-AREA MANAGEMENT TABLE

| IP ADDRESS OF SENDER TERMINAL THAT SENDS IMAGE DATA | IP ADDRESS OF DESTINATION TERMINAL THAT RECEIVES IMAGE DATA | PREDETERMINED-AREA INFORMATION | | |
|---|---|---|---|---|
| | | MOVING RADIUS ($r$) | POLAR ANGLE ($\theta$) | AZIMUTH ($\phi$) |
| 1.2.1.3 | 1.2.2.3 | 10 | 20 | 30 |
| 1.2.1.3 | 1.2.2.3 | 20 | 30 | 40 |
| 1.2.1.3 | 1.2.2.3 | ... | ... | ... |
| 1.2.2.3 | 1.2.1.3 | ... | ... | ... |
| 1.2.2.3 | 1.2.1.3 | ... | ... | ... |
| ... | ... | | | |

FIG. 31

COMMUNICATION TERMINAL, IMAGE COMMUNICATION SYSTEM, AND DISPLAY CONTROL METHOD

CROSS-REFERENCE TO RELATED APPLICATIONS

This patent application is a continuation of U.S. application Ser. No. 16/352,896, filed on Mar. 14, 2019, which is based on and claims priority pursuant to 35 U.S.C. § 119(a) to Japanese Patent Application No. 2018-065988, filed on Mar. 29, 2018, in the Japan Patent Office, the entire disclosure of each is hereby incorporated by reference herein.

BACKGROUND

Technical Field

The present disclosure relates to a communication terminal, an image communication system, and a display control method.

Related Art

DESCRIPTION OF THE RELATED ART

Videoconference systems are now in widespread use, allowing users at remote places to hold a remote conference via a communication network such as the Internet. In such videoconference systems, a communication terminal for a videoconference system is provided in a meeting room where attendants of one party in a remote conference are attending. This communication terminal collects an image or video of the meeting room including the attendants and sound such as speech made by the attendants, and transmits digital data converted from the collected image (video) and/or sound to the other party's communication terminal provided at a different meeting room. Based on the transmitted digital data, the other party's terminal displays images on a display or outputs audio from a speaker in the different conference room to establish video communication (video calling). This enables to carry out a conference among remote sites, in a state close to an actual conference.

In addition, a technique is known that connects, to a communication terminal, an image capturing device that is configured to capture a spherical panoramic image in real time, and distributes the spherical panoramic image acquired by the image capturing device from the communication terminal to each of communication terminals of the other party. Each of the communication terminals of the other party sequentially converts the received spherical panoramic image to a predetermined-area image representing a predetermined area, which is a specific part of the spherical panoramic image, and displays the predetermined-area image on a display. This enables a user in each of remote sites to determine, by his or her own, a predetermined-area image to be displayed, representing an image of a predetermined area that the user is interested in, from a whole image of the spherical panoramic image.

Further, a technique is known in which a communication terminal on a transmission side transmits original video and an object-of-interest image to a server, and the other communication terminal on a receiving side detects coordinates of the object-of-interest in the original image, so that a document image such as graphics information is superimposed in an area to which a user on the transmission side wants a user on the receiving side to pay attention in the original image.

SUMMARY

A communication terminal includes circuitry. The circuitry receives data of a whole image, data of a material image, and superimposition position information indicating a position where the material image is to be superimposed on the whole image, the data of the whole image, the data of the material image, and the superimposition position information being transmitted from another communication terminal. The circuitry superimposes the material image on the whole image at the position indicated by the superimposition position information. The circuitry causes a display provided with the communication terminal to display a predetermined-area image, which is an image of a predetermined area of the whole image. When at least a part of the material image being superimposed is not displayed in the predetermined-area image, the circuitry changes the position where the material image is superimposed such that the material image is displayed at a predetermined position in the predetermined-area image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1A is a left side view of an image capturing device, according to an embodiment of the present disclosure;

FIG. 1B is a front view of the image capturing device of FIG. 1A;

FIG. 1C is a plan view of the image capturing device of FIG. 1A;

FIG. 4A is an illustration of a Mercator image covering a sphere, according to an embodiment of the present disclosure;

FIG. 4B is an illustration of a spherical panoramic image, according to an embodiment of the present disclosure;

FIG. 5 is an illustration of relative positions of a virtual camera and a predetermined area in a case where the spherical panoramic image is represented as a three-dimensional sphere, according to an embodiment of the present disclosure;

FIGS. 14A and 14B are a block diagram illustrating a part of a functional configuration of an image communication system, according to an embodiment of the present disclosure;

FIG. 16 is a conceptual diagram illustrating an image type management table, according to an embodiment of the present disclosure;

FIG. 17 is a conceptual diagram illustrating an image capturing device management table, according to an embodiment of the present disclosure;

FIG. 18 is a conceptual diagram illustrating a predetermined-area management table, according to an embodiment of the present disclosure;

FIG. 19 is a conceptual diagram illustrating a superimposition position management table, according to an embodiment the present disclosure;

FIG. 20 is an illustration for explaining a superimposition position, according to an embodiment of the present disclosure;

FIG. 21 is a conceptual diagram illustrating a session management table, according to an embodiment of the present disclosure;

FIG. 22 is a conceptual diagram illustrating an image type management table, according to an embodiment of the present disclosure;

FIG. 23 is a conceptual diagram illustrating a predetermined-area management table, according to an embodiment of the present disclosure;

FIG. 31 is a sequence diagram illustrating another operation of sharing the predetermined-area information, according to an embodiment of the present disclosure;

Figure 2:
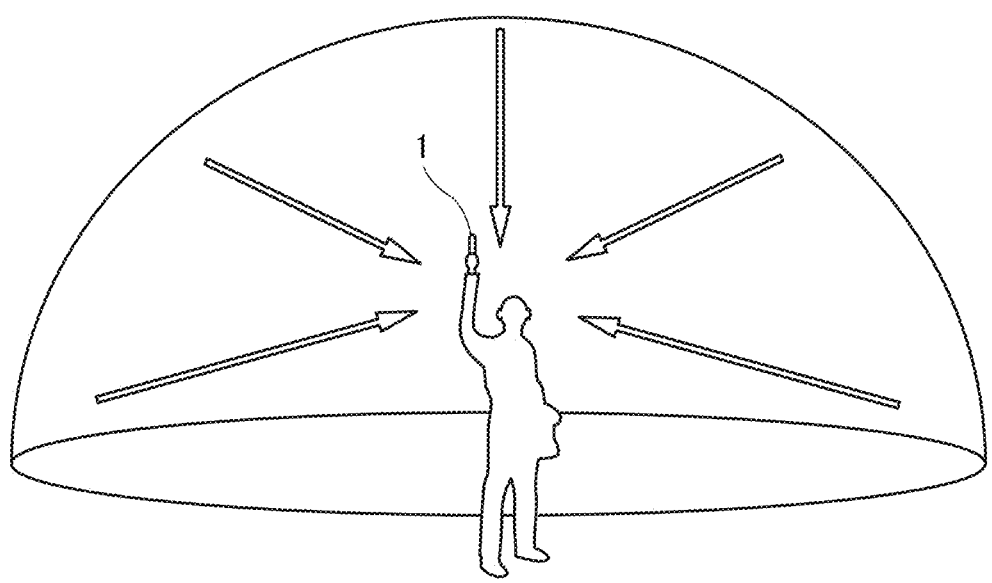
FIG. 2 is an illustration of how a user uses the image capturing device, according to an embodiment of the present disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of an embodiment of the present disclosure, with reference to FIG. 1 to FIG. 39.

Overview of Embodiment

<Generation of Spherical Panoramic Image>

Referring to FIG. 1 (FIG. 1A to 1C) to FIG. 7, a description is given of generating a spherical panoramic image.

First, a description is given of an external view of an image capturing device 1, with reference to FIG. 1A to FIG. 1C. The image capturing device 1 is a digital camera for capturing images from which a spherical image is generated. In one example, the spherical image captured by the image capturing device 1 is a 360-degree spherical panoramic image (full-view spherical image). FIGS. 1A, 1B and 1C are respectively a left side view, a front view, and a plan view of the image capturing device 1.

As illustrated in FIG. 1A, the image capturing device 1 has a shape such that one can hold it with one hand. Further, as illustrated in FIGS. 1A, 1B, and 1C, an imaging element 103a is provided on a front side (anterior side) of an upper section of the image capturing device 1, and an imaging element 103b is provided on a back side (rear side) thereof. These imaging elements (image sensors) 103a and 103b are used in combination with optical members (e.g., fisheye lenses 102a and 102b, described below), each being configured to capture a hemispherical image having an angle of view of 180 degrees or wider. As illustrated in FIG. 1B, the image capturing device 1 further includes an operation unit 115 such as a shutter button on the rear side of the image capturing device 1, which is opposite of the front side of the image capturing device 1.

Next, a description is given of a situation where the image capturing device 1 is used, with reference to FIG. 2. FIG. 2 illustrates an example of how a user uses the image capturing device 1. As illustrated in FIG. 2, for example, the image capturing device 1 is used for capturing objects surrounding a user who is holding the image capturing device 1 in his or her hand. The imaging elements 103a and 103b illustrated in FIGS. 1A to 1C capture the objects surrounding the user to obtain two hemispherical images.

Figure 3A:
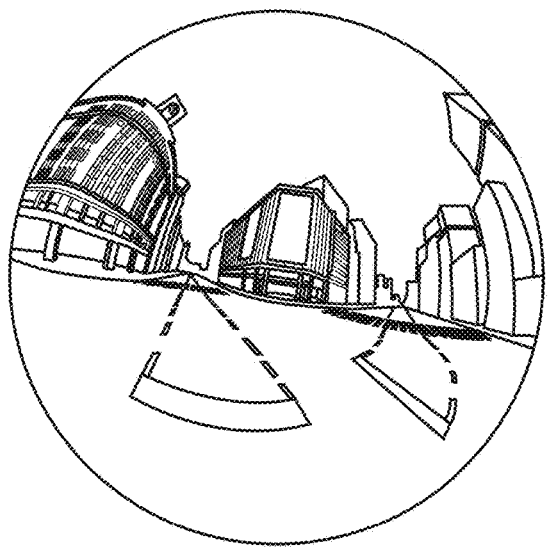
FIG. 3A is an illustration of a front side of a hemispherical image captured by the image capturing device, according to an embodiment of the present disclosure.
Figure 3B:
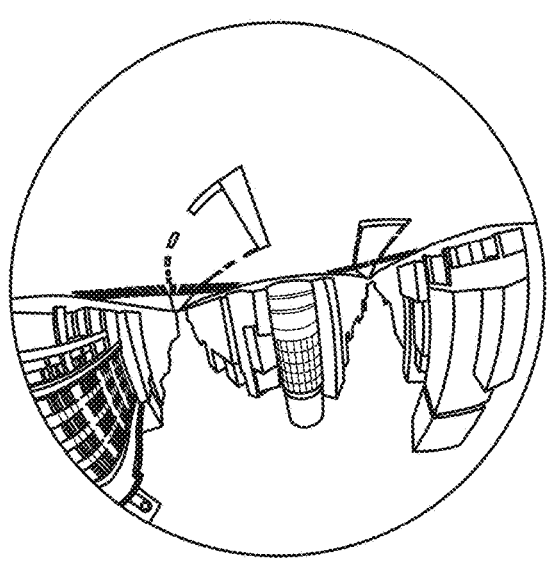
FIG. 3B is an illustration of a back side of a hemispherical image captured by the image capturing device, according to an embodiment of the present disclosure.
Figure 3C:
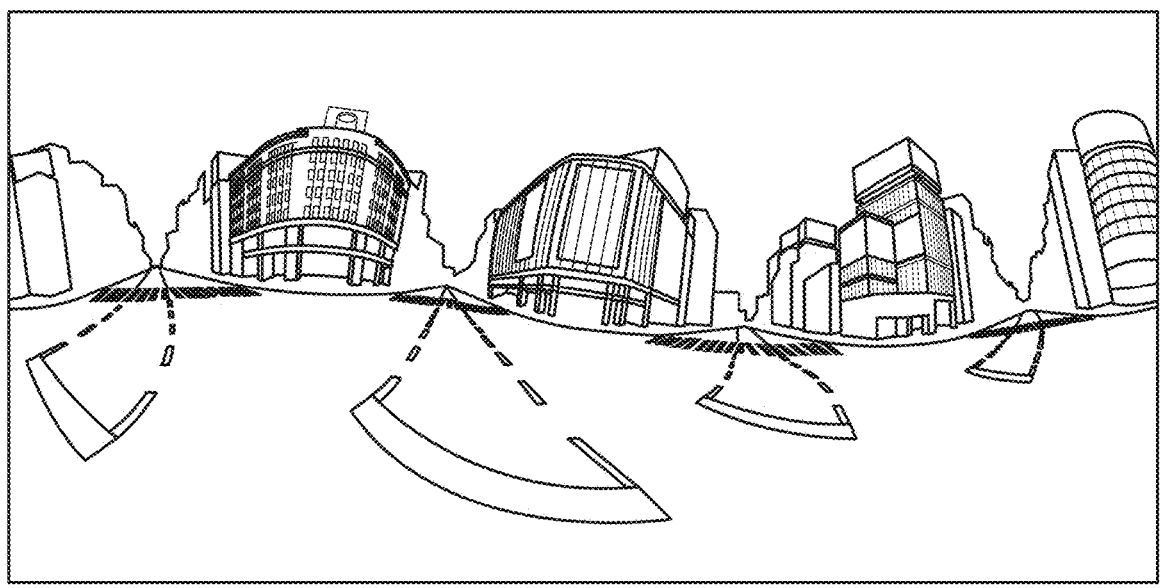
FIG. 3C is an illustration of an image captured by the image capturing device represented by Mercator projection, according to an embodiment of the present disclosure.

Next, a description is given of an overview of an operation of generating a spherical panoramic image from the images captured by the image capturing device 1, with reference to FIGS. 3A to 3C and FIGS. 4A and 4B. FIG. 3A is a view illustrating a hemispherical image (front side) captured by the image capturing device 1. FIG. 3B is a view illustrating a hemispherical image (back side) captured by the image capturing device 1. FIG. 3C is a view illustrating an image in Mercator projection. The image in Mercator projection as illustrated in FIG. 3C is referred to as a "Mercator image" hereinafter. FIG. 4A is a conceptual diagram illustrating an example of how the Mercator image maps to a surface of a sphere. FIG. 4B is a view illustrating a spherical panoramic image.

As illustrated in FIG. 3A, an image captured by the imaging element 103a is a curved hemispherical image (front side) taken through the fisheye lens 102a described later. Also, as illustrated in FIG. 3B, an image captured by the imaging element 103b is a curved hemispherical image (back side) taken through the fisheye lens 102b described later. The hemispherical image (front side) and the hemispherical image (back side), which is reversed by 180-degree, are superimposed by the image capturing device 1. This result in generation of the Mercator image as illustrated in FIG. 3C.

The Mercator image is mapped on the sphere surface using Open Graphics Library for Embedded Systems (OpenGL ES) as illustrated in FIG. 4A. This results in generation of the spherical panoramic image as illustrated in FIG. 4B. In other words, the spherical panoramic image is represented as the Mercator image, which corresponds to a surface facing a center of the sphere. It should be noted that OpenGL ES is a graphic library used for visualizing two-dimensional (2D) and three-dimensional (3D) data. The spherical panoramic image is either a still image or a moving image. The spherical panoramic image, which is an image displayed when the captured image is entirely displayed, is an example of a whole image (full view image).

One may feel strange viewing the spherical panoramic image, because the spherical panoramic image is an image mapped to the sphere surface. To resolve this strange feeling, an image of a predetermined area, which is a specific part of the spherical panoramic image, is displayed as a planar image having fewer curves. The image of the predetermined area is referred to as a "predetermined-area image" hereinafter. Hereinafter, a description is given of displaying the predetermined-area image, with reference to FIG. 5 and FIGS. 6A and 6B.

Figure 6A:
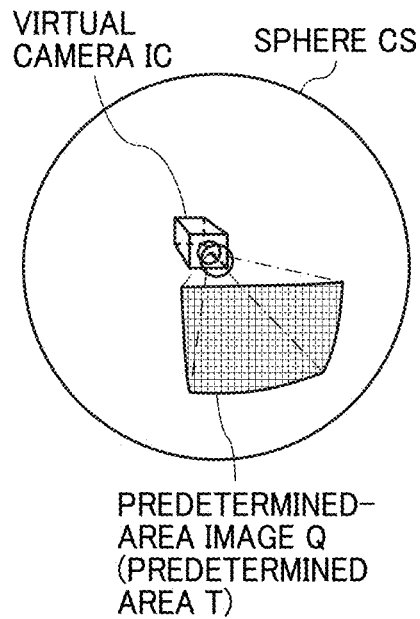
FIG. 6A is a perspective view of FIG. 5.
Figure 6B:
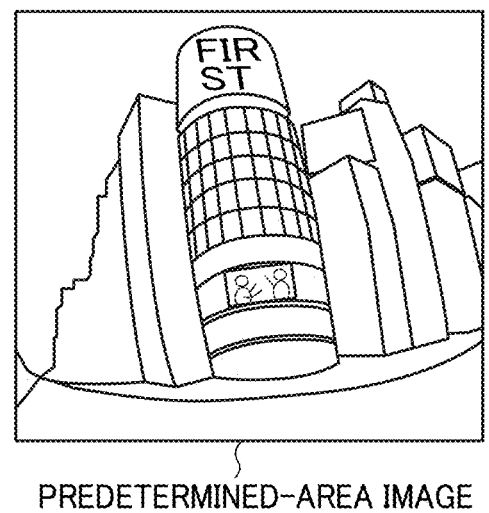
FIG. 6B is an illustration of an image of the predetermined area displayed on a display of a communication terminal, according to an embodiment of the present disclosure.

FIG. 5 is a view illustrating positions of a virtual camera IC and a predetermined area T in a case where the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of FIG. 5. FIG. 6B is a view illustrating the predetermined-area image when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is outside of the spherical image CE as illustrated in FIG. 5. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. In another example, the predetermined-area image Q is specified by an imaging area (X, Y, Z) of the virtual camera IC, i.e., the predetermined area T, rather than the predetermined-area information, i.e., the position coordinate of the virtual camera IC. In the following description of the embodiment, an imaging direction (rH, rV) and an angle of view a of the virtual camera IC are used. The predetermined-area image Q can be changed by changing the predetermined area T by changing the imaging direction (rH, rV) and the angle of view a of the virtual camera IC.

Figure 7:
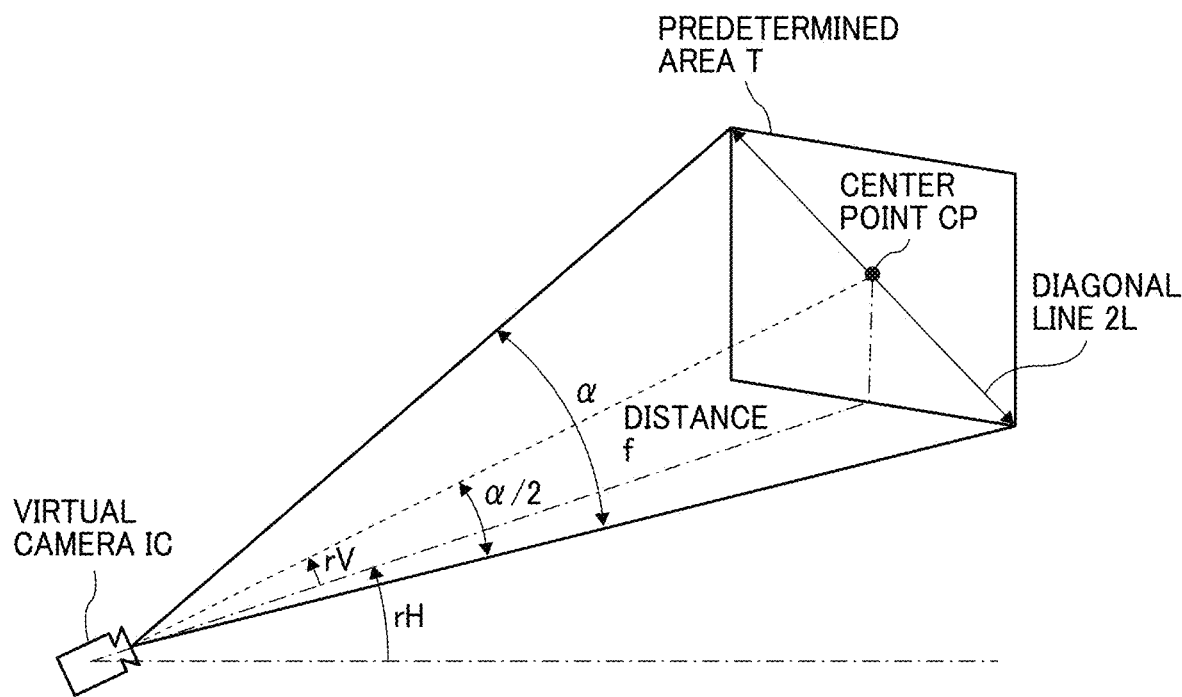
FIG. 7 is a diagram illustrating a relation between predetermined-area information and a predetermined area, according to an embodiment of the present disclosure.

Referring to FIG. 7, a relation between the predetermined-area information and an image of the predetermined area T is described according to the embodiment. FIG. 7 is a view illustrating a relation between the predetermined-area information and the predetermined area T. As illustrated in FIG. 7, "rH" denotes a horizontal radian, "rV" denotes a vertical radian, and "a" denotes an angle of view, respectively, of the virtual camera IC. The position of the virtual camera IC is adjusted, such that the point of gaze of the virtual camera IC, indicated by the imaging direction (rH, rV), matches a center point CP of the predetermined area T, which is the imaging area of the virtual camera IC. The predetermined-area image Q is an image of the predetermined area T, in the spherical image CE. "f" denotes a distance from the virtual camera IC to the center point CP of the predetermined area T. L is a distance between the center point CP and a given vertex of the predetermined area T (2L is a diagonal line). In FIG. 7, a trigonometric function equation generally expressed by the following equation 1 is satisfied.

$$L/f=\tan(\alpha/2) \quad \text{(Equation 1)}$$

Figure 8:
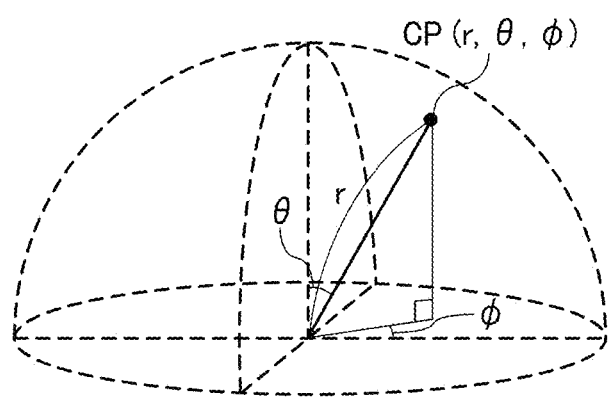
FIG. 8 is a diagram illustrating points in a three-dimensional Euclidean space according to spherical coordinates, according to an embodiment of the present disclosure.

FIG. 8 is a view illustrating points in a three-dimensional Euclidean space according to spherical coordinates, according to the embodiment. A positional coordinate (r, θ, φ) is given when the center point CP is represented by a spherical polar coordinates system. The positional coordinate (r, θ, φ) represents a moving radius, a polar angle, and an azimuth angle. The moving radius r is a distance from the origin of the three-dimensional virtual space including the spherical panoramic image to the center point CP. Accordingly, the radius r is equal to "f". FIG. 8 illustrates the relation between these items. In the following description of the embodiment, the positional coordinates (r, θ, φ) of the virtual camera IC is used.

<Overview of Image Communication System>

Figure 9:
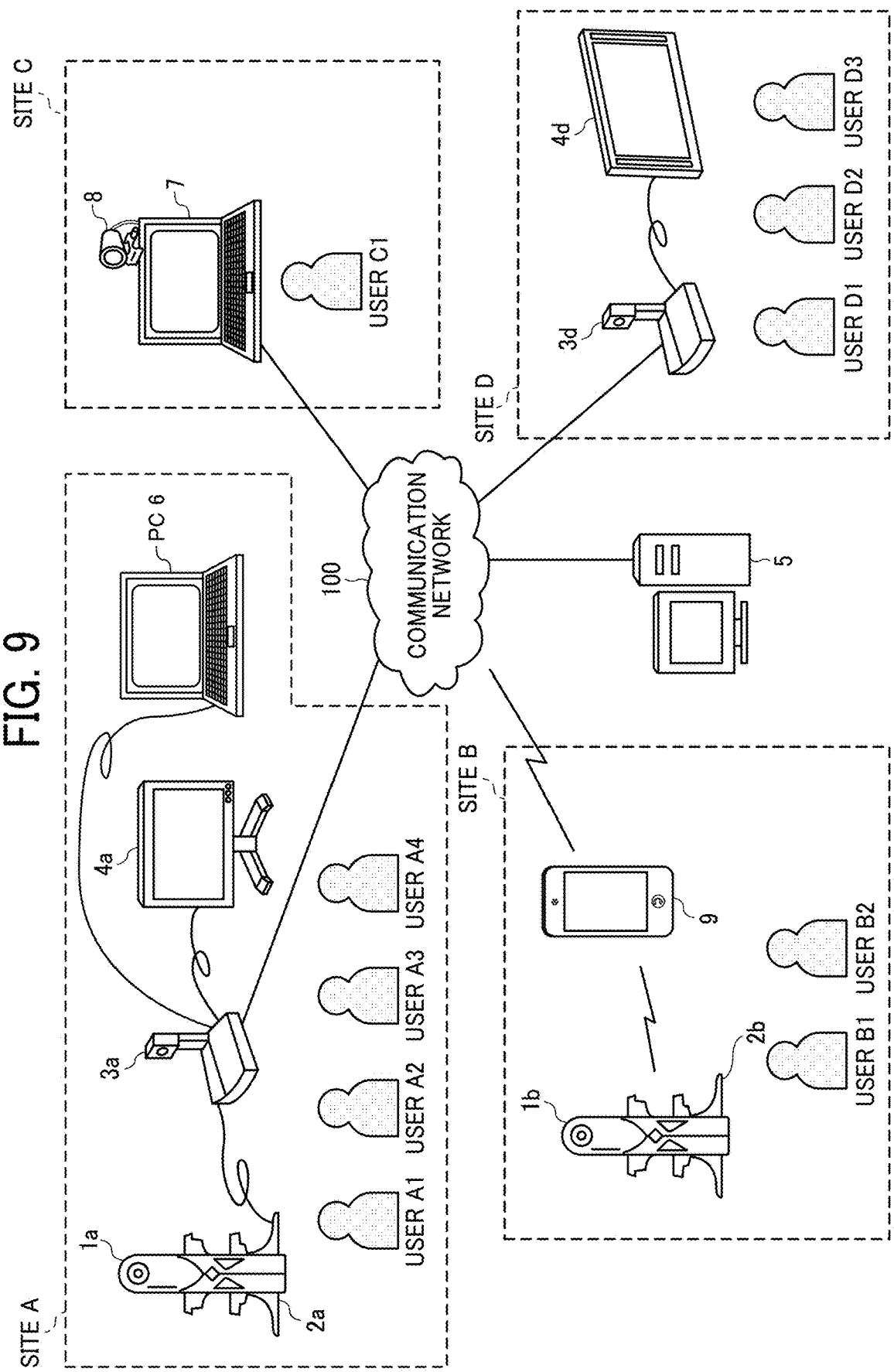
FIG. 9 is a schematic diagram illustrating a configuration of an image communication system, according to an embodiment of the present disclosure.

Referring to FIG. 9, an overview of a configuration of an image communication system according to the present embodiment is described. FIG. 9 is a schematic diagram illustrating a configuration of the image communication system according to the present embodiment.

As illustrated in FIG. 9, the image communication system according to the present embodiment includes an image capturing device 1a, an image capturing device 1b, a videoconference terminal 3a, a videoconference terminal 3d, a display 4a, a display 4d, a communication management system 5, a personal computer (PC) 6, a PC 7, an image capturing device 8, and a smartphone 9. The videoconference terminal 3a, the smartphone 9, the PC 7, and the videoconference terminal 3d communicate data with one another via a communication network 100 such as the Internet. The communication network 100 can be either a wireless network or a wired network.

Each of the image capturing device 1a and the image capturing device 1b is a special digital camera, which captures an image of object or surroundings such as scenery to obtain two hemispherical images, from which a spherical panoramic image is generated. By contrast, the image capturing device 8 is a general-purpose digital camera that captures an image of object or surroundings to obtain a general planar image.

Each of the videoconference terminal 3a and the videoconference terminal 3d is a terminal that is dedicated to videoconferencing. The videoconference terminal 3a and the videoconference terminal 3d display an image of video communication (video calling) on the display 4a and the display 4d, respectively, via a wired cable such as a universal serial bus (USB) cable. The videoconference terminal 3a usually captures an image by a camera 312, which is described later referring to FIG. 11. However, when the videoconference terminal 3a is connected to a cradle 2a on which the image capturing device 1a is mounted, the image capturing device 1a is preferentially used. Accordingly, two hemispherical images are obtained, from which a spherical panoramic image is generated. In addition, the videoconference terminal 3a is connected to the PC 6 and obtains a screen of the PC 6. When a wired cable is used for connecting the videoconference terminal 3a and the cradle 2a, the cradle 2a supplies power to the image capturing device 1a and holds the image capturing device 1a in addition to establishing communication between the image capturing device 1a and the videoconference terminal 3a. In the embodiment, the image capturing device 1a, the cradle 2a, the videoconference terminal 3a, the display 4a, and the PC 6 are provided in the same site A. In the site A, four users A1, A2, A3 and A4 are participating in video communication. On the other hand, the videoconference terminal 3d and the display 4d are provided in the same site D. In the site D, three users D1, D2, and D3 are participating in video communication.

The communication management system 5 manages and controls communication among the videoconference terminal 3a, the videoconference terminal 3d, the PC 7 and the smartphone 9. Further, the communication management system 5 manages types (a general image type and a special image type) of image data to be exchanged among the videoconference terminal 3a, the videoconference terminal 3d, the PC 7 and the smartphone 9. In other words, the communication management system 5 is a communication control system. In the embodiment, a special image is a spherical panoramic image, and a general image is a planar image. The communication management system 5 is provided, for example, at a service provider that provides video communication service. In one example, the communication management system 5 is configured as a single computer. In another example, the communication management system 5 is configured as a plurality of computers to which one or more units (functions, means, or storages) are arbitrarily allocated. In other words, the communication management system 5 can be implemented by a plurality of servers that operate in cooperation with one another.

The PC 6 generates material image data, which is data of a material image to be displayed in a video conference. Examples of the material image includes, without limitation, an image displayed, created or edited by a general-purpose application operating on the PC 6, and an image photographed by a general-purpose digital camera or the like and reproduced on the PC 6.

The PC 7 performs video communication using the image capturing device 8 connected thereto. In the embodiment, the PC 7 and the image capturing device 8 are provided in the same site C. In the site C, one user C is participating in video communication.

The smartphone 9 includes a display 917, which is described later, and displays an image of video communication on the display 917. The smartphone 9 includes a complementary metal oxide semiconductor (CMOS) sensor 905, and usually captures an image using the CMOS sensor 905. In addition, the smartphone 9 is configured to obtain data of two hemispherical images captured by the image capturing device 1b, from which a spherical panoramic image is to be generated, using wireless communication such as Wireless Fidelity (Wi-Fi) and Bluetooth (registered trademark). When wireless communication is used for obtaining the data of two hemispherical images, a cradle 2b supplies power with the image capturing device 1b and holds the image capturing device 1b, but not establish a communication. In the embodiment, the image capturing device 1b, the cradle 2b, and the smartphone 9 are located in the same site B. Further, in the site B, two users B1 and B2 are participating in video communication.

Each of the videoconference terminal 3a, the videoconference terminal 3d, the PC 7 and the smartphone 9 is an example of a communication terminal. OpenGL ES is installed in each of the communication terminals to enable each of the communication terminals to generate predetermined-area information that indicates a partial area of a spherical panoramic image, or to generate a predetermined-area image from a spherical panoramic image that is transmitted from a different one of the communication terminals.

The arrangement of the terminals (communication terminal, display, image capturing device), apparatuses and users illustrated in FIG. 9 is just an example, and any other suitable arrangement will suffice. For example, in the site C, an image capturing device configured to capture a spherical panoramic image can be used in place of the image capturing device 8. In addition, examples of the communication terminal include a digital television, a smartwatch, and a car navigation system. In the following description, any arbitrary one of the image capturing device 1a and the image capturing device 1b is referred to as "image capturing device 1". Further, any arbitrary one of the videoconference terminal 3a and the videoconference terminal 3d is referred to as "videoconference terminal 3", hereinafter. Furthermore, any arbitrary one of the display 4a and the display 4d is referred to as "display 4", hereinafter.

<Hardware Configuration of Embodiment>

Next, referring to FIG. 10 to FIG. 13, a description is given in detail of hardware configurations of the image capturing device 1, the videoconference terminal 3, the communication management system 5, the PC 6, the PC 7, and the smartphone 9, according to the present embodiment. Since the image capturing device 8 is a general-purpose camera, a detailed description thereof is omitted.

<Hardware Configuration of Image Capturing Device 1>

Figure 10:
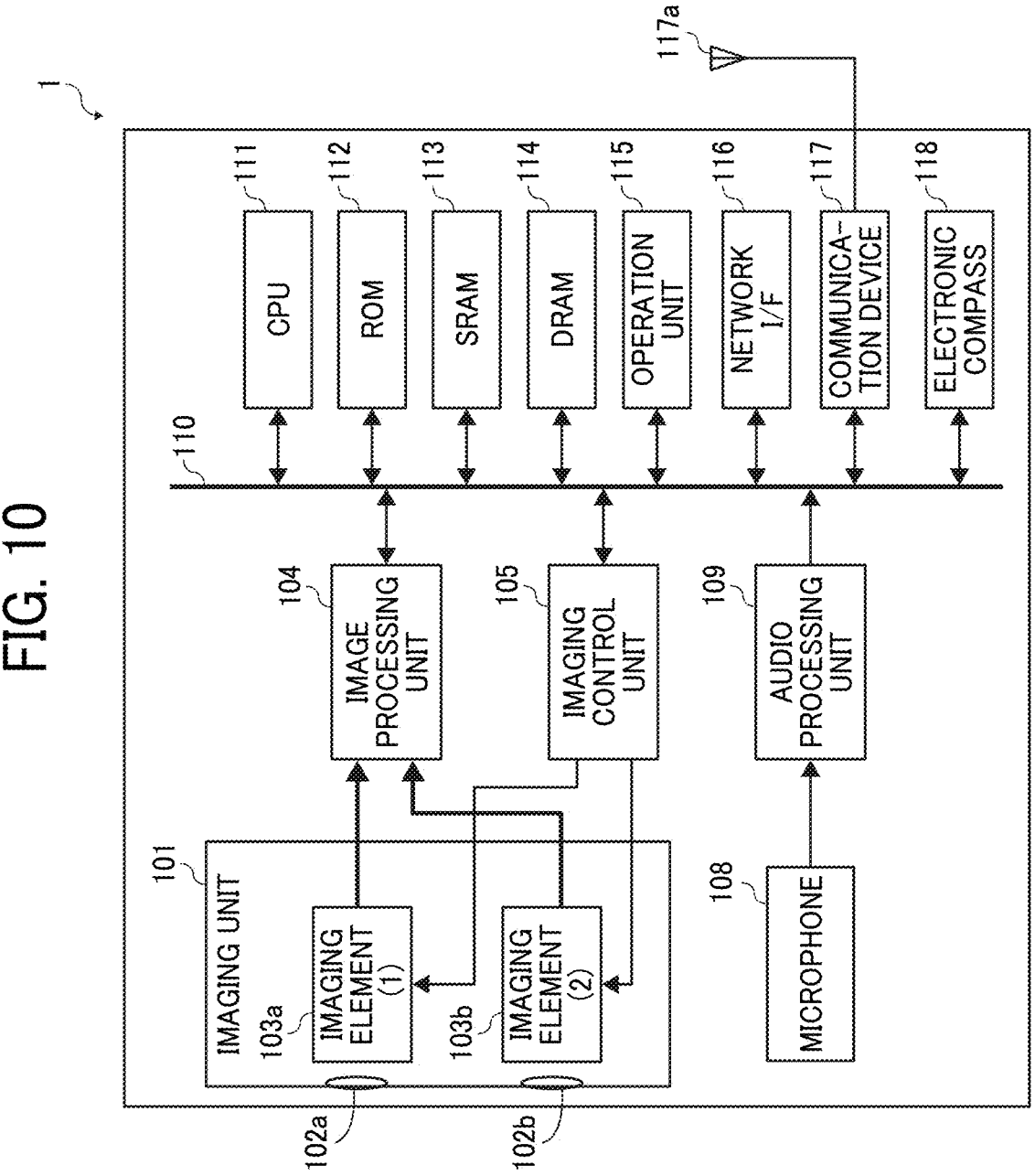
FIG. 10 is a block diagram illustrating a hardware configuration of the image capturing device, according to an embodiment of the present disclosure.

First, referring to FIG. 10, a hardware configuration of the image capturing device 1 is described according to the embodiment. FIG. 10 is a block diagram illustrating a hardware configuration of the image capturing device 1 according to the embodiment. The following describes a case in which the image capturing device 1 is a spherical (omnidirectional) image capturing device having two imaging elements. However, the image capturing device 1 can include any suitable number of imaging elements, providing that it includes at least two imaging elements. In addition, the image capturing device 1 is not necessarily an image capturing device dedicated to omnidirectional image capturing. In another example, an external omnidirectional image capturing unit can be attached to a general-purpose digital camera or a smartphone to implement an image capturing device having substantially the same function as that of the image capturing device 1.

As illustrated in FIG. 10, the image capturing device 1 includes an imaging unit 101, an image processing unit 104, an imaging control unit 105, a microphone 108, an audio processing unit 109, a central processing unit (CPU) 111, a read only memory (ROM) 112, a static random access memory (SRAM) 113, a dynamic random access memory (DRAM) 114, the operation unit 115, a network interface (I/F) 116, a communication device 117, and an antenna 117a.

The imaging unit 101 includes two wide-angle lenses (so-called fisheye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. Each of the imaging elements 103a and 103b includes an imaging sensor such as a CMOS sensor and a charge-coupled device (CCD) sensor, a timing generation circuit, and a group of registers. The imaging sensor converts an optical image formed by the fisheye lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processing unit 104 via a parallel I/F bus. In addition, each of the imaging elements 103a and 103b of the imaging unit 101 is connected to the imaging control unit 105 via a serial I/F bus such as an I2C bus. Each of the image processing unit 104 and the imaging control unit 105 is connected to the CPU 111 via a bus 110. Furthermore, the ROM 112, the SRAM 113, the DRAM 114, the operation unit 115, the network I/F 116, the communication device 117, and the electronic compass 118 are also connected to the bus 110.

The image processing unit 104 obtains image data from each of the imaging elements 103a and 103b via the parallel I/F bus and performs predetermined processing on the image data obtained from each of the imaging elements 103a and 103b separately. Thereafter, the image processing unit 104 superimposes these image data to generate data of the Mercator image as illustrated in FIG. 3C.

The imaging control unit 105 usually functions as a master device while each of the imaging elements 103a and 103b usually functions as a slave device. The imaging control unit 105 sets commands and the like in the group of registers of each of the imaging elements 103a and 103b via the I2C bus. The imaging control unit 105 receives necessary commands from the CPU 111. Further, the imaging control unit 105 obtains status data of the group of registers of each of the imaging elements 103a and 103b via the I2C bus. The imaging control unit 105 sends the obtained status data to the CPU 111.

The imaging control unit 105 instructs the imaging elements 103a and 103b to output the image data at a time when the shutter button of the operation unit 115 is pressed. The image capturing device 1 can support a preview display function (e.g., displaying a preview on a display such as a display of the videoconference terminal 3a) or a movie display function. In case of displaying movie, image data are continuously output from the imaging elements 103a and 103b at a predetermined frame rate (frames per minute).

Furthermore, the imaging control unit 105 operates in cooperation with the CPU 111, to synchronize the time when the imaging element 103a outputs image data and the time when the imaging element 103b outputs the image data. In the present embodiment, the image capturing device 1 does not include a display unit (display). However, in another example, the image capturing device 1 can include a display.

The microphone 108 converts sound into audio data (signals). The audio processing unit 109 obtains audio data output from the microphone 108 via an I/F bus and performs predetermined processing on the audio data.

The CPU 111 controls entire operation of the image capturing device 1 and performs necessary processing. The ROM 112 stores various programs for execution by the CPU 111. Each of the SRAM 113 and the DRAM 114 operates as a work memory to store programs loaded from the ROM 112 for execution by the CPU 111 or data being currently processed. More specifically, in one example, the DRAM 114 stores image data currently processed by the image processing unit 104 and data of the Mercator image on which processing has been performed.

The operation unit 115 collectively refers to various operation keys, a power switch, the shutter button, and a touch panel having functions of both displaying information and receiving input from a user, which can be used in combination. A user operates the operation keys to input various image capturing (photographing) modes or image capturing (photographing) conditions.

The network I/F 116 collectively refers to an interface circuit such as a USB I/F that enables the image capturing device 1 to communicate data with an external medium such as a secure digital (SD) card or an external personal computer. The network I/F 116 supports at least one of wired and wireless communications. The data of the Mercator image, which is stored in the DRAM 114, can be stored in the external medium via the network I/F 116 or transmitted to the external device such as the videoconference terminal 3a via the network I/F 116, at any desired time.

The communication device 117 communicates with an external device such as the videoconference terminal 3a via the antenna 117a of the image capturing device 1 using a short-range wireless communication network such as Wi-Fi and Near Field Communication (NFC). The communication device 117 is also capable of transmitting the data of Mercator image to the external device such as the videoconference terminal 3a.

The electronic compass 118 computes an orientation and a tilt (roll angle) of the image capturing device 1 based on the Earth's magnetism to output orientation and tilt information. This orientation and tilt information is an example of related information, which is metadata described in compliance with Exif. This information is used for image processing such as image correction on captured images. The related information also includes data of a time (date) when an image is captured by the image capturing device 1, and data size of image data, for example.

<Hardware Configuration of Videoconference Terminal 3>

Figure 11:
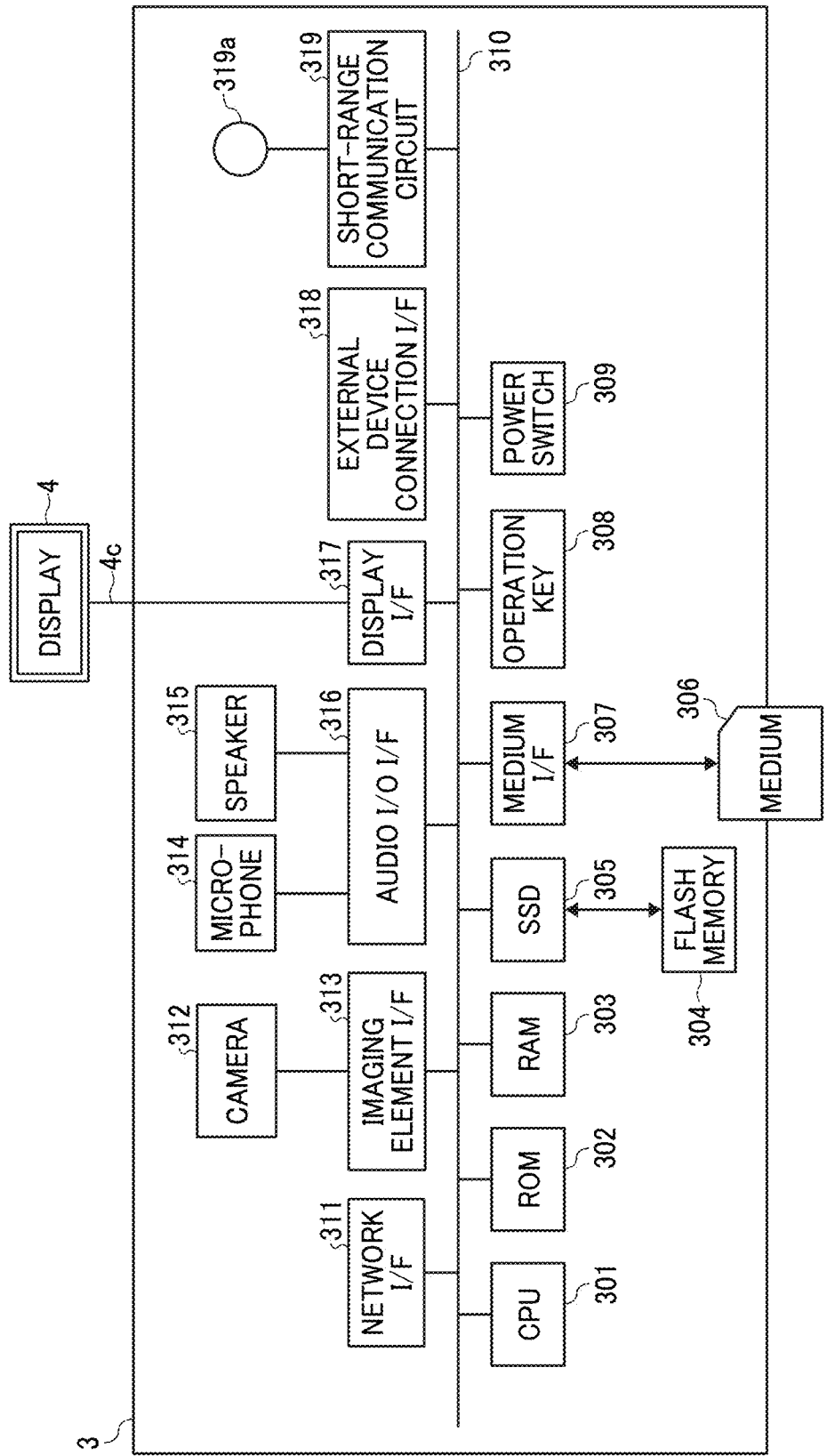
FIG. 11 is a block diagram illustrating a hardware configuration of a videoconference terminal, according to an embodiment of the present disclosure.

Next, referring to FIG. 11, a hardware configuration of the videoconference terminal 3 is described according to the embodiment. FIG. 11 is a block diagram illustrating a hardware configuration of the videoconference terminal 3 according to the embodiment. As illustrated in FIG. 11, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output I/F 316, a display I/F 317, an external device connection I/F 318, a short-range communication circuit 319, and an antenna 319a for the short-range communication circuit 319.

The CPU 301 controls entire operation of the videoconference terminal 3. The ROM 302 stores a control program such as an Initial Program Loader (IPL) to boot the CPU 301. The RAM 303 is used as a work area for the CPU 301.

The flash memory 304 stores various data such as a communication control program, image data, and audio data. The SSD 305 controls reading and writing of various data from and to the flash memory 304 under control of the CPU 301. In alternative to the SSD, a hard disc drive (HDD) can be used. The medium I/F 307 controls reading and writing (storing) of data from and to a storage medium 306 such as a flash memory. The operation key (keys) 308 is operated by a user to input a user instruction such as a user selection of a destination of communication from the videoconference terminal 3. The power switch 309 is a switch that turns on or off the power of the videoconference terminal 3.

The network I/F 311 in an interface that controls communication of data between the videoconference terminal 3 and an external device through the communication network 100 such as the Internet. The camera 312 is an example of a built-in imaging device configured to capture a subject under control of the CPU 301 to obtain image data. The imaging element I/F 313 is a circuit that controls driving of the camera 312. The microphone 314 is an example of a built-in audio collecting device configured to input audio. The audio input/output I/F 316 is a circuit for controlling input and output of audio signals between the microphone 314 and the speaker 315 under control of the CPU 301. The display I/F 317 is a circuit for transmitting image data to the display 4, which is external to the videoconference terminal 3, under control of the CPU 301. The external device connection I/F 318 is an interface that connects the videoconference terminal 3 to various external devices. The short-range communication circuit 319 is a communication circuit that establish communication in compliance with the NFC (registered trademark), the Bluetooth (registered trademark) and the like.

The bus line 310 is an address bus, a data bus or the like, which electrically connects the elements in FIG. 11 such as the CPU 301.

The display 4 is an example of a display device that displays an image of a subject, an operation icon, etc. The display 4 is configured as a liquid crystal display or an organic electroluminescence (EL) display, for example. The display 4 is connected to the display I/F 317 by a cable 4c. For example, the cable 4c is an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes a lens and a solid-state imaging element that converts an image (video) of a subject to electronic data by converting light to electric charge. As the solid-state imaging element, for example, a CMOS sensor or a CCD sensor is used. The external device connection I/F 318 is configured to connect the videoconference terminal 3 to an external device such as an external camera, an external microphone, or an external speaker through a USB cable or the like. When an external camera is connected, the external camera is driven in preference to the built-in camera 312 under control of the CPU 301. Similarly, when an external microphone is connected or an external speaker is connected, the external microphone or the external speaker is driven in preference to the built-in microphone 314 or the built-in speaker 315 under control of the CPU 301.

The storage medium 306 is removable from the videoconference terminal 3. In addition to or in alternative to the flash memory 304, any suitable nonvolatile memory, such as an electrically erasable and programmable ROM (EEPROM) can be used, provided that it reads or writes data under control of CPU 301.

<Hardware Configuration of Communication Management System 5, PC 6, and PC 7>

Figure 12:
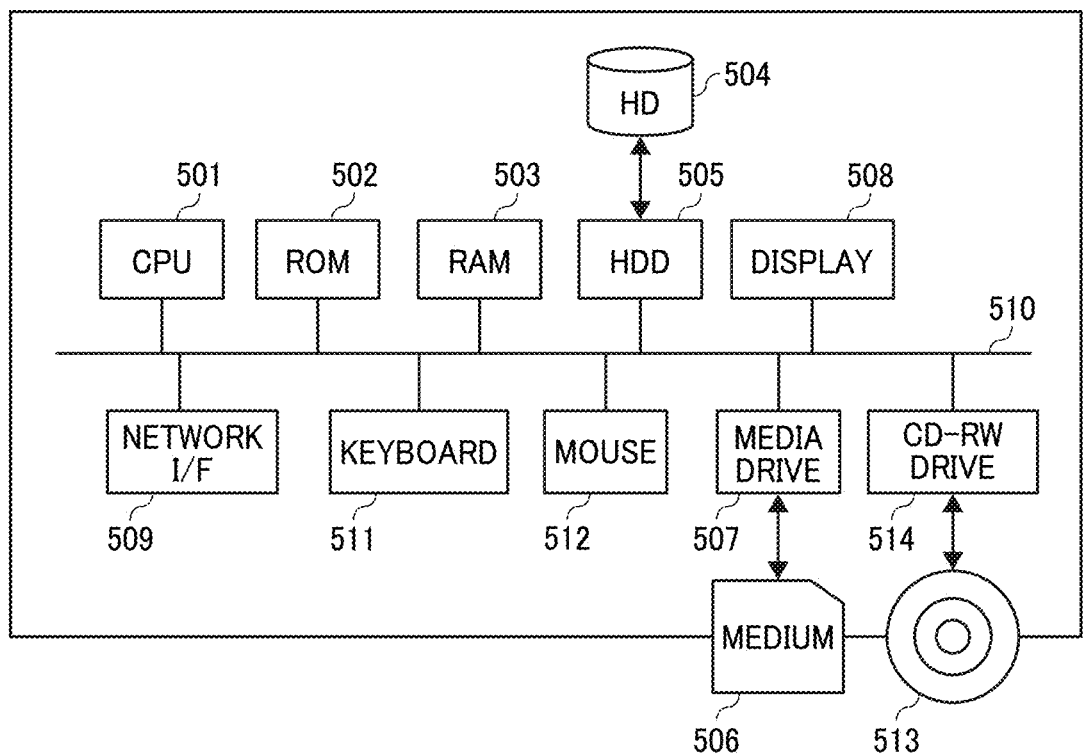
FIG. 12 is a block diagram illustrating a hardware configuration of any one of a communication management system and a personal computer, according to an embodiment of the present disclosure.

Next, referring to FIG. 12, a hardware configuration of each of the communication management system 5, the PC 6 and the PC 7 is described, according to the embodiment. FIG. 12 is a block diagram illustrating a hardware configuration of any one of the communication management system 5, PC 6 and the PC 7, according to the embodiment. In the embodiment, the communication management system 5, the PC 6 and the PC 7 are individually implemented by a computer. Therefore, a description is given of a configuration of the communication management system 5, and the description of a configuration of each of the PC 6 and the PC 7 is omitted, having the same or substantially the same configuration as that of the communication management system 5.

The communication management system 5 includes a CPU 501, a ROM 502, a RAM 503, a hard disc (HD) 504, an HDD 505, a media drive 507, a display 508, a network I/F 509, a keyboard 511, a mouse 512, a compact disc rewritable (CD-RW) drive 514, and a bus line 510. The CPU 501 controls entire operation of the communication management system 5. The ROM 502 stores a control program such as an IPL to boot the CPU 501. The RAM 503 is used as a work area for the CPU 501. The HD 504 stores various types of data, such as a control program for the communication management system 5. The HDD 505 controls reading and writing of various data from and to the HD 504 under control of the CPU 501. The media drive 507 controls reading and writing (storing) of data from and to a storage medium 506 such as a flash memory. The display 508 displays various information such as a cursor, menu, window, characters, or image. The network I/F 509 is an interface that controls communication of data between the communication management system 5 and an external device through the communication network 100. The keyboard 511 includes a plurality of keys to allow a user to input characters, numerals, or various instructions. The mouse 512 allows a user to select a specific instruction or execution, select a target for processing, or move a cursor being displayed. The CD-RW drive 514 controls reading and writing of various data from and to a CD-RW 513, which is one example of a removable storage medium. The bus line 510 is an address bus, a data bus or the like, which electrically connects the above-described hardware elements, as illustrated in FIG. 12.

<Hardware Configuration of Smartphone 9>

Figure 13:
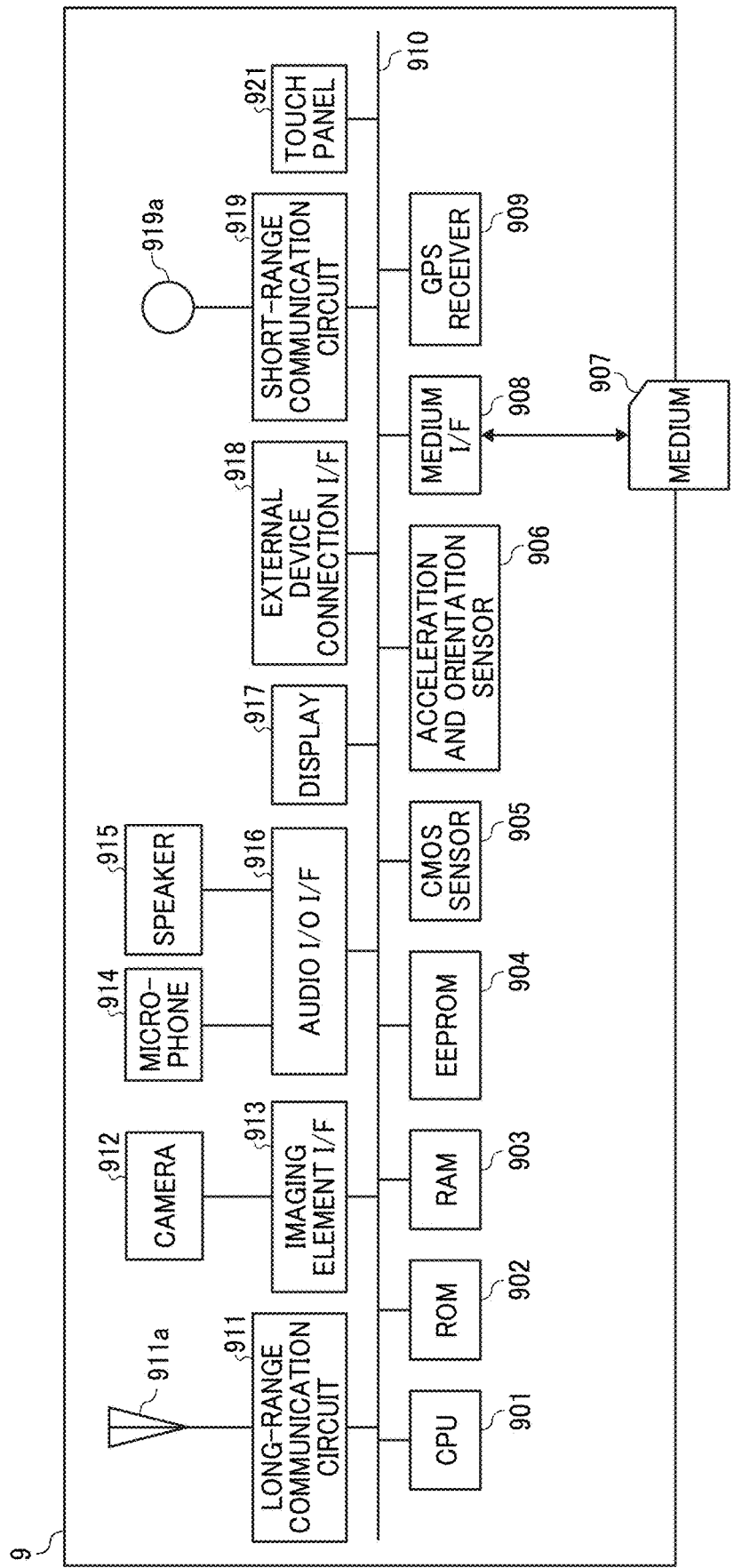
FIG. 13 is a block diagram illustrating a hardware configuration of a smartphone, according to an embodiment of the present disclosure.

Referring to FIG. 13, a hardware configuration of the smartphone 9 is described, according to the embodiment. FIG. 13 is a block diagram illustrating a hardware configuration of the smartphone 9, according to the embodiment. As illustrated in FIG. 13, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls entire operation of the smartphone 9. The ROM 902 stores a control program such as an IPL to boot the CPU 901. The RAM 903 is used as a work area for the CPU 901. The EEPROM 904 reads or writes various data such as a control program for a smartphone under control of the CPU 901. The CMOS sensor 905 captures an object (mainly, a self-image of a user operating the smartphone 9) under control of the CPU 901 to obtain image data. The acceleration and orientation sensor 906 includes various sensors such as an electromagnetic compass for detecting geomagnetism, a gyrocompass, and an acceleration sensor. The medium I/F 908 controls reading and writing of data from and to a storage medium 907 such as a flash memory. The GPS receiver 909 receives GPS signals from a GPS satellite.

The smartphone 9 further includes a long-range communication circuit 911, a camera 912, an imaging element I/F 913, a microphone 914, a speaker 915, an audio input/output I/F 916, a display 917, an external device connection I/F 918, a short-range communication circuit 919, an antenna 919a for the short-range communication circuit 919, and a touch panel 921.

The long-range communication circuit 911 is a circuit that enables the smartphone 9 to communicate with other device through the communication network 100. The camera 912 is an example of a built-in imaging device configured to capture a subject under control of the CPU 901 to obtain image data. The imaging element I/F 913 is a circuit that controls driving of the camera 912. The microphone 914 is an example of a built-in audio collecting device configured to input audio. The audio input/output I/F 916 is a circuit for controlling input and output of audio signals between the microphone 914 and the speaker 915 under control of the CPU 901. The display 917 is an example of a display device that displays an image of a subject, various icons, etc. The display 917 is configured as a liquid crystal display or an organic EL display, for example. The external device connection I/F 918 is an interface that connects the smartphone 9 to various external devices. The short-range communication circuit 919 is a communication circuit that establish communication in compliance with the NFC, the Bluetooth and the like. The touch panel 921 is an example of an input device that enables a user to operate the smartphone 9 by touching a screen of the display 917.

The smartphone 9 further includes a bus line 910. The bus line 910 is an address bus, a data bus or the like, which electrically connects the elements in FIG. 13 such as the CPU 901.

In addition, a storage medium such as a CD-ROM storing any of the above-described programs and/or an HD storing any of the above-described programs can be distributed domestically or overseas as a program product.

<Functional Configuration of Embodiment>

Figure 14B:
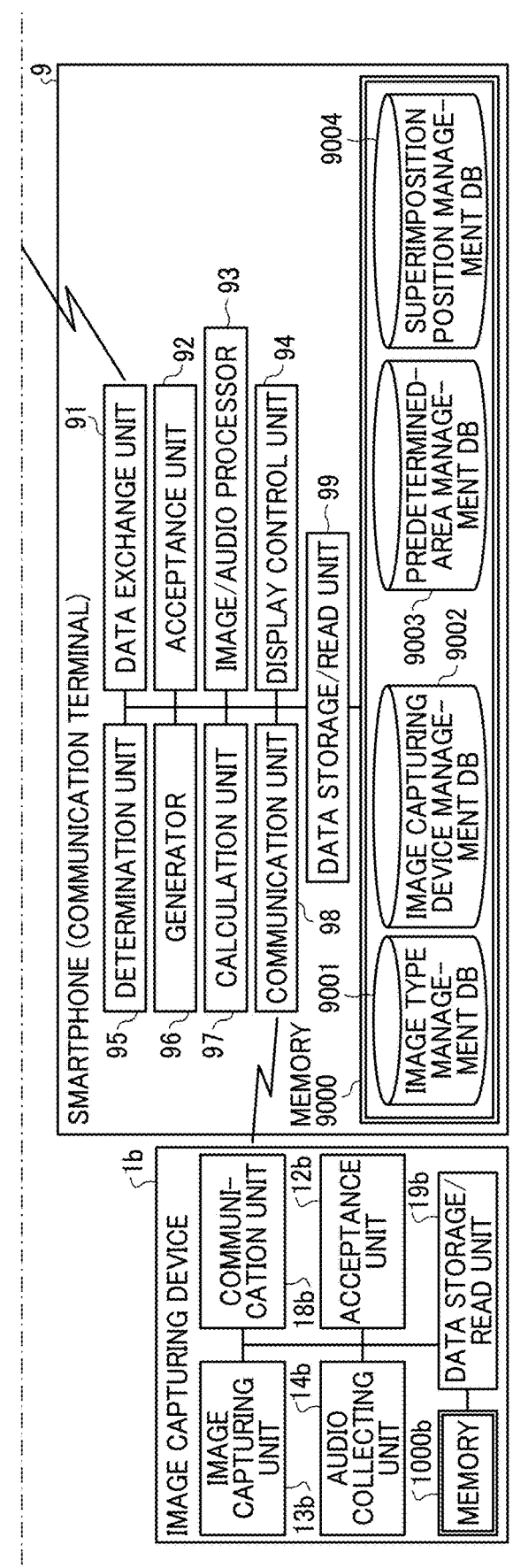
Figure 15:
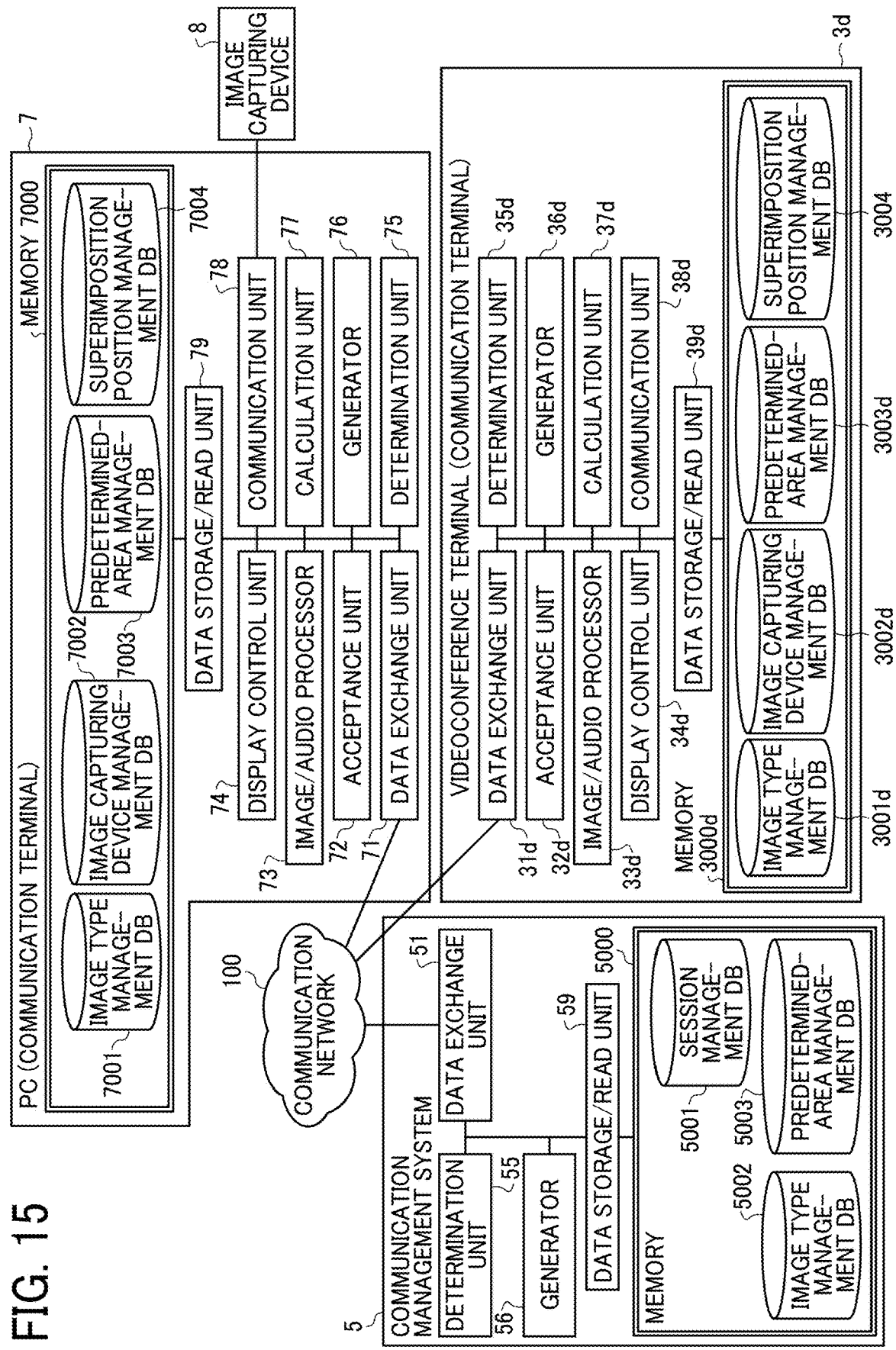
FIG. 15 is a block diagram illustrating another part of the functional configuration of the image communication system, according to an embodiment of the present disclosure.

Referring to FIGS. 14 to 23, a functional configuration of the image communication system is described according to the present embodiment. FIGS. 14A and 14B and FIG. 15 are block diagrams, each illustrating a part of a functional configuration of the image communication system.

<Functional Configuration of Image Capturing Device 1a>

As illustrated in FIG. 14A, the image capturing device 1a includes an acceptance unit 12a, an image capturing unit 13a, an audio collecting unit 14a, a communication unit 18a, and a data storage/read unit 19a. Each of the above-mentioned units is a function or means that is implemented by or that is caused to function by operating any one or more of the hardware elements illustrated in FIG. 10 in cooperation with instructions from the CPU 111 according to a control program for the image capturing device 1a, expanded from the SRAM 113 to the DRAM 114.

The image capturing device 1a further includes a memory 1000a, which is implemented by the ROM 112, the SRAM 113, and/or the DRAM 114 illustrated in FIG. 10. The memory 1000a stores therein a globally unique identifier (GUID) identifying the own device (i.e., the image capturing device 1a itself).

The image capturing device 1b includes an acceptance unit 12b, an image capturing unit 13b, an audio collecting unit 14b, a communication unit 18b, a data storage/read unit 19b, and a memory 1000b. These functional units of the image capturing device 1b implement the similar or substantially the similar functions as those of the acceptance unit 12a, the image capturing unit 13a, the audio collecting unit 14a, the communication unit 18a, the data storage/read unit 19a, and the memory 1000a of the image capturing device 1a, respectively. Therefore, redundant descriptions thereof are omitted below.

(Each Functional Unit of Image Capturing Device 1a)

Referring to FIG. 10 and FIG. 14A, each of the functional units of the image capturing device 1a is described in detail.

The acceptance unit 12a of the image capturing device 1a is mainly implemented by the operation unit 115 illustrated in FIG. 10, which operates under control of the CPU 111. The acceptance unit 12a receives an instruction input from the operation unit 115 according to a user operation.

The image capturing unit 13a is implemented mainly by the imaging unit 101, the image processing unit 104, and the imaging control unit 105, illustrated in FIG. 10, each of which operates under control of the CPU 111. The image capturing unit 13a captures an image of object or surroundings to obtain captured-image data.

The audio collecting unit 14a is mainly implemented by the microphone 108 and the audio processing unit 109 illustrated in FIG. 10, each of which operates under control of the CPU 111. The audio collecting unit 14a collects sounds around the image capturing device 1a.

The communication unit 18a, which is mainly implemented by instructions of the CPU 111, communicates data with a communication unit 38a of the videoconference terminal 3a using a short-range wireless communication network in compliance with NFC, Bluetooth, or Wi-Fi, for example.

The data storage/read unit 19a, which is mainly implemented by instructions of the CPU 111 illustrated in FIG. 10, stores various data or information in the memory 1000a or reads out various data or information from the memory 1000a.

<Functional Configuration of Videoconference Terminal 3a>

As illustrated in FIG. 14A, the videoconference terminal 3a includes a data exchange unit 31a, an acceptance unit 32a, an image/audio processor 33a, a display control unit 34a, a determination unit 35a, a generator 36a, a calculation unit 37a, communication unit 38a, and a data storage/read unit 39a. Each of the above-mentioned units is a function or means that is implemented by or that is caused to function by operating any one or more of the hardware elements illustrated in FIG. 11 in cooperation with instructions from the CPU 301 according to a control program for the videoconference terminal 3a, expanded from the flash memory 304 to the RAM 303.

The videoconference terminal 3a further includes a memory 3000a, which is implemented by the ROM 302, the RAM 303, and the flash memory 304 illustrated in FIG. 11. The memory 3000a includes an image type management database (DB) 3001a, an image capturing device management DB 3002a, a predetermined-area management DB 3003a, and a superimposition position management DB 3004a. Among these DBs, the image type management DB 3001a is configured as an image type management table as illustrated in FIG. 16. The image capturing device management DB 3002a is configured as an image capturing device management table as illustrated in FIG. 17. The predetermined-area management DB 3003a is configured as a predetermined-area management table as illustrated in FIG. 18.

The superimposition position management DB 3004a is configured as a superimposition position management table as illustrated in FIG. 19.

The videoconference terminal 3d includes a data exchange unit 31d, an acceptance unit 32d, an image/audio processor 33d, a display control unit 34d, a determination unit 35d, a generator 36d, a calculation unit 37d, a communication unit 38d, and a data storage/read unit 39d, and a memory 3000d. These functional units of the videoconference terminal 3d implement the similar of substantially the similar functions as those of the data exchange unit 31a, the acceptance unit 32a, the image/audio processor 33a, the display control unit 34a, the determination unit 35a, the generator 36a, the calculation unit 37a, the communication unit 38a, the data storage/read unit 39a, and the memory 3000a of the videoconference terminal 3a, respectively. Therefore, redundant descriptions thereof are omitted below. In addition, the memory 3000d of the videoconference terminal 3d includes an image type management DB 3001d, and an image capturing device management DB 3002d, a predetermined-area management DB 3003d, and a superimposition position management DB 3004d. These DBs 3001d, 3002d, 3003d and 3004d have the same or the substantially the same data structure as the image type management DB 3001a, the image capturing device management DB 3002a, the predetermined-area management DB 3003a, and the superimposition position management DB 3004a of the videoconference terminal 3a, respectively. Therefore, redundant descriptions thereof are omitted below.

(Image Type Management Table)

FIG. 16 is an illustration of an example data structure of the image type management table. The image type management table stores an image data identifier (ID), an internet protocol (IP) address, which is an example of an address of a terminal as a transmission source of image data, and a source name, in association with one another. The terminal as a transmission source is hereinafter referred to as a "sender terminal". The image data ID is one example of image data identification information identifying image data to be used in video communication. The same image data ID is assigned to image data transmitted from the same sender terminal. Accordingly, a destination terminal (that is, a communication terminal that receives image data) identifies a sender terminal from which the received image data is transmitted. An IP address of the sender terminal, which is associated with a specific image data ID, is an IP address of a communication terminal that transmits image data identified by that image data ID associated with the IP address. A source name, which is associated with a specific image data ID, is a name for specifying an image capturing device that outputs the image data identified by that image data ID associated with the source name.

The source name is one example of image type information. The source name is a name generated by a communication terminal such as the videoconference terminal 3a according to a predetermined naming rule.

The example of the image type management table illustrated in FIG. 16 indicates that four communication terminals, whose IP addresses are respectively "1.2.1.3", "1.2.2.3", "1.3.1.3", and "1.3.2.3" transmit image data identified by the image data ID "RS001", "RS002", "RS003", and "RS004", respectively. Further, according to the image type management table illustrated in FIG. 16, the image types represented by the source names of those four communication terminals are "Video Theta", "Video Theta", "Video", and "Video" that indicate the image types, which are "special image", "special image", "general image", and "general image", respectively. In the embodiment, the "special image" is a spherical panoramic image.

In another example, data other than the image data are stored in the image type management table in association with the image data ID. Examples of the data other than the image data include audio data.

(Image Capturing Device Management Table)

FIG. 17 is an illustration of an example data structure of the image capturing device management table. The image capturing device management table stores a vendor ID and a product ID among the GUIDs of an image capturing device that is configured to obtain two hemispherical images, from which a spherical panoramic image is generated. As the GUID, a combination of a vendor ID (VID) and a product ID (PID) used in a USB device is used, for example. The vendor ID and the product ID are stored in a communication terminal such as a videoconference terminal before shipment. In another example, these IDs are added and stored in the videoconference terminal after shipment.

(Predetermined-Area Management Table)

FIG. 18 is an illustration of an example data structure of the predetermined-area management table. The predetermined-area management table stores an IP address of a communication terminal (sender terminal) as a transmission source of captured-image data representing a captured image, an IP address of a communication terminal (destination terminal) as a destination of the captured-image data, and predetermined-area information indicating a predetermined-area image being displayed at the destination terminal, in association with one another. The destination terminal of the captured-image data is identical with the sender terminal of the predetermined-area information. The predetermined-area information is a conversion parameter used to convert from a captured image to an image (predetermined-area image) of a predetermined area T of the captured image, as illustrated in FIG. 6A, FIG. 6B, and FIG. 7. The IP address is used as one example of address information. Other examples of the address information include a media access control (MAC) address and a terminal ID, which identifies a corresponding communication terminal. In the embodiment, an IPv4 address is simplified to represent the IP address. In another example, an IPv6 address is used as the IP address.

In the example of FIG. 18, the predetermined-area management table indicates, in the first line to the third line of the table, that the videoconference terminal 3a having an IP address of "1.2.1.3" transmits captured-image data, via the communication management system 5, to the videoconference terminal 3d having an IP address of "1.2.2.3", the PC 7 having an IP address of "1.3.1.3", and the smartphone 9 having an IP address of "1.3.2.3". Further, the predetermined-area management table illustrated in FIG. 18 indicates that the videoconference terminal 3d is a sender terminal of the predetermined-area information (r=10, θ=20, φ=30). In substantially the same manner, the predetermined-area management table indicates that the PC 7 is a sender terminal of the predetermined-area information (r=20, θ=30, φ=40). Furthermore, the predetermined-area management table indicates that the smartphone 9 is a sender terminal of the predetermined-area information (r=30, θ=40, φ=50).

When the data exchange unit 31a newly receives predetermined-area information including the same set of the IP address of the sender terminal of captured-image data and the destination terminal of captured-image data as that currently managed in the table, the data storage/read unit 39a overwrites currently managed predetermined-area information with the newly received predetermined-area information.

(Superimposition Position Management Table)

FIG. 19 is an illustration of an example data structure of the superimposition position management table. The superimposition position management table manages an IP address of the sender terminal that transmits captured-image data in association with superimposition position information indicating a position on the spherical panoramic image where a material image is to be superimposed. The material image is a superimposition source image (superimposition target image), i.e., an image that is to be superimposed on another image. The spherical panoramic image is a superimposition destination image, i.e., an image on which another image is to be superimposed.

Referring to FIG. 20, a description is given of superimposition coordinates, which is one example of the superimposition position information. FIG. 20 illustrates a Mercator image of a spherical image on which a material image, which is a superimposition source image, is superimposed. The superimposition coordinates include a start point coordinate and an end point coordinate. Assuming that the vertex position at the upper left corner of the material image, which is a superimposition source image, is a start point, the start point coordinate is (0,0) and the end point coordinate is (xn, yn). In this case, when the material image is superimposed on the Mercator image in manner that the start point coordinate (0, 0) and the end point coordinate (xn, yn) of the material image corresponds to a coordinate (x1, y1) and a coordinate (x2, y2) on the Mercator image, (x1, x2) is stored as the start point coordinate and (x2, y2) is stored as the end point coordinate in the superimposition position management table in association with the IP address. The IP address is used as one example of address information. Other examples of the address information include a MAC address and a terminal ID, which identifies a corresponding communication terminal. In the embodiment, an IPv4 address is simplified to represent the IP address. In another example, an IPv6 address is used as the IP address.

(Each Functional Unit of Videoconference Terminal 3a)

Referring to FIG. 11 and FIG. 14A, each of the functional units of the videoconference terminal 3a is described in detail.

The data exchange unit 31a of the videoconference terminal 3a is mainly implemented by the network I/F 311 illustrated in FIG. 11, which operates under control of the CPU 301. The data exchange unit 31a exchanges various data or information with communication management system 5 via the communication network 100.

The acceptance unit 32a is mainly implemented by the operation key 308, which operates under control of the CPU 301. The acceptance unit 32a receives selections or inputs according to a user operation. In another example, an input device such as a touch panel is used in addition to or in place of the operation key 308.

The image/audio processor 33a, which is implemented by instructions of the CPU 301 illustrated in FIG. 11, processes image data obtained by capturing a subject by the camera 312. After voice sound generated by a user is converted to audio signals by the microphone 314, the image/audio processor 33a performs processing on audio data corresponding to the audio signals.

Further, the image/audio processor 33a processes image data received from another communication terminal based on the image type information such as the source name. The display control unit 34a causes the display 4 to display an image based on the processed image data. More specifically, when the image type information indicates "special image", the image/audio processor 33a converts the image data such as hemispherical image data as illustrated in FIGS. 3A and 3B into spherical image data to generate a spherical panoramic image as illustrated in FIG. 4B. Furthermore, when there is a material image to be superimposed on the spherical panoramic image, the image/audio processor 33a generates a superimposed image, which is an image generated by superimposing the material image on the spherical panoramic image, based on the material image data and the superimposition position information. Further, the image/audio processor 33a generates a predetermined-area image as illustrated in FIG. 6B. Furthermore, the image/audio processor 33a outputs, to the speaker 315, audio signals according to audio data received from another communication terminal via the communication management system 5. The speaker 315 outputs sound based on the audio signal.

The display control unit 34a is mainly implemented by the display I/F 317, which operates under control of the CPU 301. The display control unit 34a causes the display 4 to display various images or characters.

The determination unit 35a, which is mainly implemented by instructions of the CPU 301, determines an image type corresponding to image data received from, for example, the image capturing device 1a. This determination is just one example performed by the determination unit 35a, and the determination unit 35a performs other various determinations regarding image data.

The generator 36a is mainly implemented by instructions of the CPU 301. The generator 36a generates a source name, which is one example of the image type information, according to the above-described naming rule, based on a determination result obtained by the determination unit 35a indicating one of a general image or a special image (the "special image" is a spherical panoramic image, in the embodiment). For example, when the determination unit 35a determines that the image type is a general image, the generator 36a generates a source name of "Video" that indicates a general image type. By contrast, when the determination unit 35a determines that the image type is a special image, the generator 36a generates a source name of "Video Theta" that indicates a special image type.

The calculation unit 37a, which is mainly implemented by instructions of the CPU 301, calculates the superimposition position information.

The communication unit 38a is mainly implemented by the short-range communication circuit 319 and the antenna 319a, each of which operates under control of the CPU 301. The communication unit 38a communicates data with the communication unit 18a of the image capturing device 1a using a short-range wireless communication network in compliance with NFC, Bluetooth, or Wi-Fi, for example. In the above description, the communication unit 38a and the data exchange unit 31a individually have a communication unit. In another example, the communication unit 38a and the data exchange unit 31a share a single communication unit.

The data storage/read unit 39a, which is mainly implemented by instructions of the CPU 301 illustrated in FIG. 11, stores various data or information in the memory 3000 or reads out various data or information from the memory 3000.

<Functional Configuration of Communication Management System 5>

Referring to FIG. 12 and FIG. 15, each of the functional units of the communication management system 5 is described in detail. The communication management system 5 includes a data exchange unit 51, a determination unit 55, a generator 56, and a data storage/read unit 59. Each of the above-mentioned units is a function or means that is implemented by or that is caused to function by operating any one or more of the hardware elements illustrated in FIG. 12 in cooperation with instructions from the CPU 501 according to a control program for the communication management system 5, expanded from the HD 504 to the RAM 503.

The communication management system 5 further includes a memory 5000, which is implemented by the RAM 503 and the HD 504 illustrated in FIG. 12. The memory 5000 includes a session management DB 5001, an image type management DB 5002, and a predetermined-area management DB 5003. The session management DB 5001 is implemented by a session management table illustrated in FIG. 21. The image type management DB 5002 is implemented by an image type management table illustrated in FIG. 22. The predetermined-area management DB 5003 is implemented by a predetermined-area management table illustrated in FIG. 23.

(Session Management Table)

FIG. 21 is an illustration of an example data structure of the session management table. The session management table stores a session ID and an IP address of a participant communication terminal, in association with each other. The session ID is one example of session identification information for identifying a session that implements video communication. Each session ID is generated for a corresponding virtual conference room. The one or more session IDs are also stored and managed in each communication terminal, such as the videoconference terminal 3a, to be used by each communication terminal to select a communication session. The IP address of the participant communication terminal indicates an IP address of the communication terminal participating in a virtual conference room identified by an associated session ID.

(Image Type Management Table)

FIG. 22 is an illustration of an example data structure of the image type management table. The image type management table illustrated in FIG. 22 stores, in addition to the information items stored in the image type management table illustrated in FIG. 16, the same session IDs as those stored in the session management table, in association with one another. The example of the image type management table illustrated in FIG. 22 indicates that three communication terminals whose IP addresses are "1.2.1.3", "1.2.2.3", and "1.3.1.3" are participating in the virtual conference room identified by the session ID "se101". The communication management system 5 stores the same image data ID, IP address of the sender terminal, and image type information as those stored in a communication terminal, such as the videoconference terminal 3a. This enables the communication management system 5 to transmit the image type information, etc., to a communication terminal that is currently participating in video communication and another communication terminal that newly participates in the video communication by entering a virtual conference room of the video communication. Accordingly, the communication terminal that is already in the video communication and the communication terminal that is newly participates in the video communication do not have to such information including the image type information.

(Predetermined-Area Management Table)

FIG. 23 is an illustration of an example data structure of the predetermined-area management table. The predetermined-area management table illustrated in FIG. 23 has substantially the same data structure as the predetermined-area management table illustrated in FIG. 18. However, as described later, since the data exchange unit 51 transmits, to each communication terminal, the latest predetermined-area information at preset intervals such as every thirty seconds, all the predetermined-area information received by the data exchange unit 51 during a period from when the predetermined-area information is transmitted last time to when the latest predetermined-area information is transmitted, is kept stored without being deleted. In the example of FIG. 23, the more recent the predetermined-area information is, the upper record in the predetermined-area management table.

(Each Functional Unit of Communication Management System 5)

Referring to FIG. 12 and FIG. 15, each of the functional units of the communication management system 5 is described in detail.

The data exchange unit 51 of the communication management system 5 is mainly implemented by the network I/F 509, which operates under control of the CPU 501 illustrated in FIG. 12. The data exchange unit 51 exchanges various data or information with the videoconference terminal 3a, the videoconference terminal 3d, or the PC 7 through the communication network 100.

The determination unit 55, which is mainly implemented by instructions of the CPU 501, performs various determinations.

The generator 56, which is mainly implemented by instructions of the CPU 501, generates an image data ID.

The data storage/read unit 59 is mainly implemented by the HDD 505 illustrated in FIG. 12, which operates under control of the CPU 501. The data storage/read unit 59 stores various data or information in the memory 5000 or reads out various data or information from the memory 5000.

<Functional Configuration of PC 6>

Referring to FIGS. 12 and 14, a functional configuration of the PC 6 is described according to the embodiment.

As illustrated in FIG. 14A, the PC 6 includes an acceptance unit 62, a display control unit 64, a communication unit 68, and a data storage/read unit 69. Each of the above-mentioned units is a function or means that is implemented by or that is caused to function by operating any one or more of the hardware elements illustrated in FIG. 12 in cooperation with instructions from the CPU 501 according to a control program for the PC 6, expanded from the HD 504 to the RAM 503.

The PC 6 further includes a memory 6000, which is implemented by the ROM 502, the RAM 503 and the HD 504 illustrated in FIG. 12.

(Each Functional Unit of PC 6)

The acceptance unit 62 of the PC 6 is mainly implemented by the keyboard 511 and the mouse 512, which operate under control of the CPU 501. The acceptance unit 62 implements the similar or substantially the similar function to that of the acceptance unit 32a. The display control unit 64 is mainly implemented by instructions of the CPU 501. The display control unit 64 causes the display 508 to display various images or characters. The communication unit 68, which is mainly implemented by instructions of the CPU 501, communicates data with a communication unit 38a of the videoconference terminal 3a using a short-range wireless communication network in compliance with NFC, Bluetooth, or Wi-Fi, for example. The data storage/read unit 69, which is mainly implemented by instructions of the CPU 501, stores various data or information in the memory 6000 or reads out various data or information from the memory 6000.

<Functional Configuration of PC 7 as Communication Terminal>

Referring to FIGS. 12 and 15, a functional configuration of the PC 7 is described according to the embodiment. The PC 7 has substantially the same functions as those of the videoconference terminal 3a. In other words, as illustrated in FIG. 15, the PC 7 includes a data exchange unit 71, an acceptance unit 72, an image/audio processor 73, a display control unit 74, a determination unit 75, a generator 76, a calculation unit 77, a communication unit 78, and a data storage/read unit 79. Each of the above-mentioned units is a function or means that is implemented by or that is caused to function by operating any one or more of the hardware elements illustrated in FIG. 12 in cooperation with instructions from the CPU 501 according to a control program for the PC 7, expanded from the HD 504 to the RAM 503.

The PC 7 further includes a memory 7000, which is implemented by the ROM 502, the RAM 503 and the HD 504 illustrated in FIG. 12. The memory 7000 includes an image type management DB 7001, an image capturing device management DB 7002, a predetermined-area management DB 7003, and a superimposition position management DB 7004. The image type management DB 7001, the image capturing device management DB 7002, the predetermined-area management DB 7003, and the superimposition position management DB 7004 have substantially the same data structure as the image type management DB 3001a, the image capturing device management DB 3002a, the predetermined-area management DB 3003a, and the superimposition position management DB 3004a, respectively, and redundant descriptions thereof are omitted below.

(Each functional Unit of PC 7 as Communication Terminal)

The data exchange unit 71 of the PC 7 is mainly implemented by the network I/F 509, which operates under control of the CPU 501 illustrated in FIG. 12. The data exchange unit 71 implements the similar or substantially the similar function to that of the data exchange unit 31a.

The acceptance unit 72 is mainly implemented by the keyboard 511 and the mouse 512, which operates under control of the CPU 501. The acceptance unit 72 implements the similar or substantially the similar function to that of the acceptance unit 32a. The image/audio processor 73, which is mainly implemented by instructions of the CPU 501, implements the similar or substantially the similar function to that of the image/audio processor 33a. The display control unit 74, which is mainly implemented by instructions of the CPU 501, implements the similar or substantially the similar function to that of the display control unit 34a. The determination unit 75, which is mainly implemented by instructions of the CPU 501, implements the similar or substantially the similar function to that of the determination unit 35a. The generator 76, which is mainly implemented by instructions of the CPU 501, implements the similar or substantially the similar function to that of the generator 36a. The calculation unit 77, which is mainly implemented by instructions of the CPU 501, implements the similar or substantially the similar function to that of the calculation unit 37a. The communication unit 78, which is mainly implemented by instructions of the CPU 501, implements the similar or substantially the similar function to that of the communication unit 38a. The data storage/read unit 79, which is mainly implemented by instructions of the CPU 501, stores various data or information in the memory 7000 or reads out various data or information from the memory 7000.

<Functional Configuration of Smartphone 9>

Referring to FIG. 13 and FIG. 14B, a functional configuration of the smartphone 9 is described, according to the embodiment. The smartphone 9 has substantially the same functions as the videoconference terminal 3a. In other words, as illustrated in FIG. 14B, the smartphone 9 includes a data exchange unit 91, an acceptance unit 92, an image/audio processor 93, a display control unit 94, a determination unit 95, a generator 96, a calculation unit 97, a communication unit 98, and a data storage/read unit 99. Each of the above-mentioned units is a function or means that is implemented by or that is caused to function by operating any one or more of the hardware elements illustrated in FIG. 13 in cooperation with instructions from the CPU 901 according to a control program for the smartphone 9, expanded from the EEPROM 904 to the RAM 903.

The smartphone 9 further includes a memory 9000, which is implemented by the ROM 902, the RAM 903, and the EEPROM 904 illustrated in FIG. 13. The memory 9000 includes an image type management DB 9001, an image capturing device management DB 9002, a predetermined-area management DB 9003, and a superimposition position management DB 9004. The image type management DB 9001, the image capturing device management DB 9002, the predetermined-area management DB 9003, and the superimposition position management DB 9004 have substantially the same data structure as the image type management DB 3001a, the image capturing device management DB 3002a, the predetermined-area management DB 3003a, and the superimposition position management DB 3004a, respectively, and redundant descriptions thereof are omitted below.

(Each Functional Unit of Smartphone 9)

The data exchange unit 91 of the smartphone 9 is mainly implemented by the long-range communication circuit 911 illustrated in the FIG. 13, which operates under control of the CPU 901. The data exchange unit 91 implements the similar or substantially the similar function to that of the data exchange unit 31a.

The acceptance unit 92 is mainly implemented by the touch panel 921, which operates under control of the CPU 901. The acceptance unit 92 implements the similar or substantially the similar function to that of the acceptance unit 32a.

The image/audio processor 93, which is mainly implemented by instructions of the CPU 901, implements the similar or substantially the similar function to that of the image/audio processor 33a. The display control unit 94, which is mainly implemented by instructions of the CPU 901, implements the similar or substantially the similar function to that of the display control unit 34a. The determination unit 95, which is mainly implemented by instructions of the CPU 901, implements the similar or substantially the similar function to that of the determination unit 35a. The generator 96, which is mainly implemented by instructions of the CPU 901, implements the similar or substantially the similar function to that of the generator 36a. The calculation unit 97, which is mainly implemented by instructions of the CPU 901, implements the similar or substantially the similar function to that of the calculation unit 37a. The communication unit 98, which is mainly implemented by instructions of the CPU 901, implements the similar or substantially the similar function to that of the communication unit 38a. The data storage/read unit 99, which is implemented by instructions of the CPU 901, stores various data or information in the memory 9000 or reads out various data or information from the memory 9000.

<Operation or Processes of Embodiment>

Referring to FIGS. 24 to 39, a description is given of an operation or processes according to the present embodiment.

<Participation Process>

Figure 24:
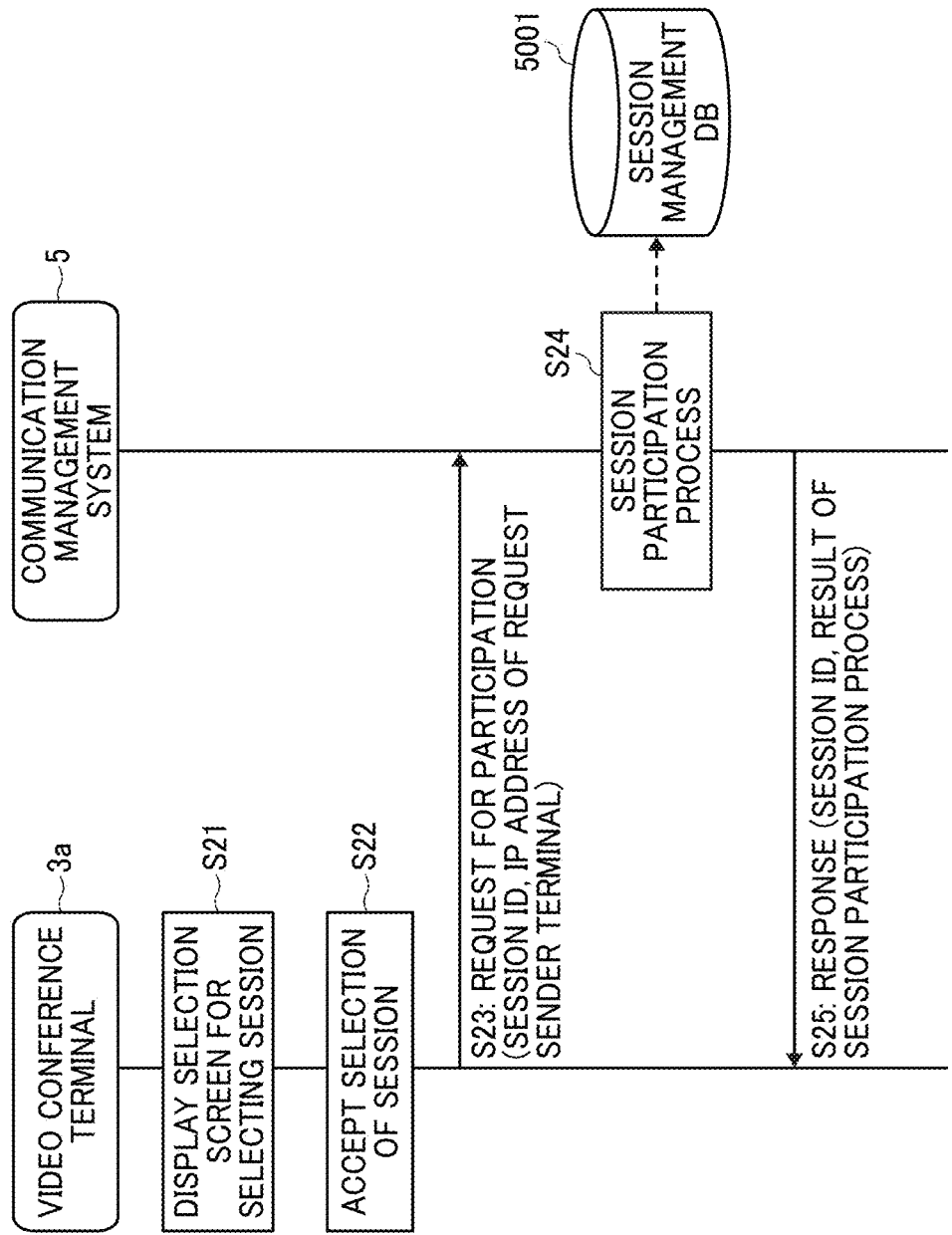
FIG. 24 is a sequence diagram illustrating an operation of participating in a specific communication session, according to an embodiment of the present disclosure.
Figure 25:
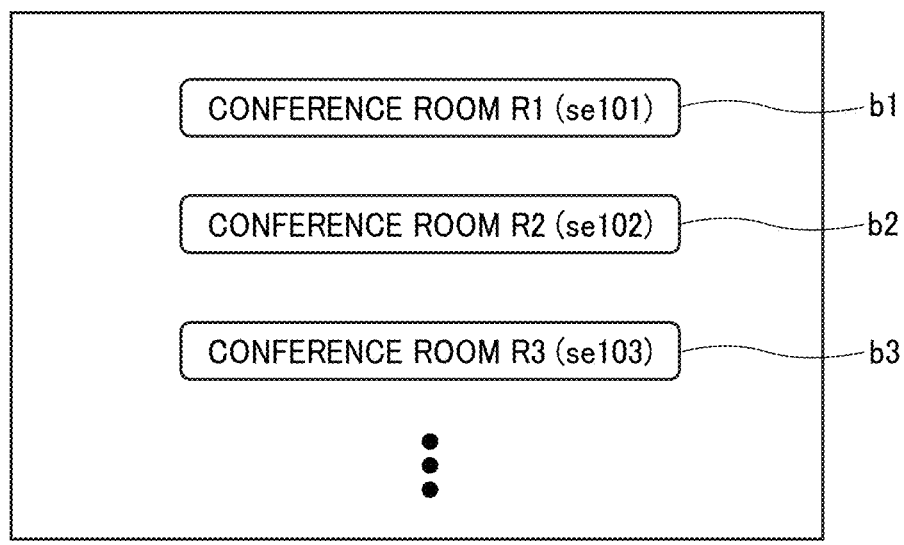
FIG. 25 is an illustration of a session selection screen for selecting a communication session (virtual conference room), according to an embodiment of the present disclosure.

Referring to FIG. 24 and FIG. 25, an operation of participating in a specific communication session is described, according to the embodiment. FIG. 24 is a sequence diagram illustrating an operation of participating in a specific communication session, according to the embodiment. FIG. 25 is an illustration of a session selection screen for selecting a communication session (virtual conference room), according to the embodiment.

When a user in the site A (e.g., user A1) operates the videoconference terminal 3a to display the session selection screen for selecting a desired communication session (virtual conference room), the acceptance unit 32a receives the operation to display the session selection screen. Accordingly, the display control unit 34a causes the display 4a to display the session selection screen as illustrated in FIG. 25 (step S21). In the session selection screen, selection buttons b1, b2, and b3 are displayed. The selection buttons b1, b2, and b3 respectively indicates virtual conference rooms R1, R2, R3, each of which is a selection target. Each of the selection buttons b1, b2, and b3 is associated with a corresponding session ID.

When the user A1 selects a desired selection button (in this example, the selection button b1) on the session selection screen, the acceptance unit 32a receives selection of a corresponding communication session (step S22). Then, the data exchange unit 31a transmits a request to participate in the communication session, namely to enter the corresponding virtual conference room, to the communication management system 5 (step S23). This participation request includes a session ID identifying the communication session for which the selection is received at step S22, and the IP address of the videoconference terminal 3a, which is a request sender terminal. The communication management system 5 receives the participation request at the data exchange unit 51.

Next, the data storage/read unit 59 performs a process for causing the videoconference terminal 3a to participate in the communication session (step S24). More specifically, the data storage/read unit 59 adds, in the session management DB 5001 (FIG. 21), the IP address that is received at step S23 to a field of the participant terminal IP address in a record of the session ID that is the same as the session ID received at step S23. The data exchange unit 51 transmits a response to the participation request to the videoconference terminal 3a (step S25). This response to the participation request includes the session ID that is received in step S23, and a result of the participation operation. The videoconference terminal 3a receives the response to the participation request at the data exchange unit 31a. The following describes a case where the operation for causing the videoconference terminal 3a to participate in the communication session, namely the participation process, is successfully completed.

<Operation of Managing Image Type Information>

Figure 26:
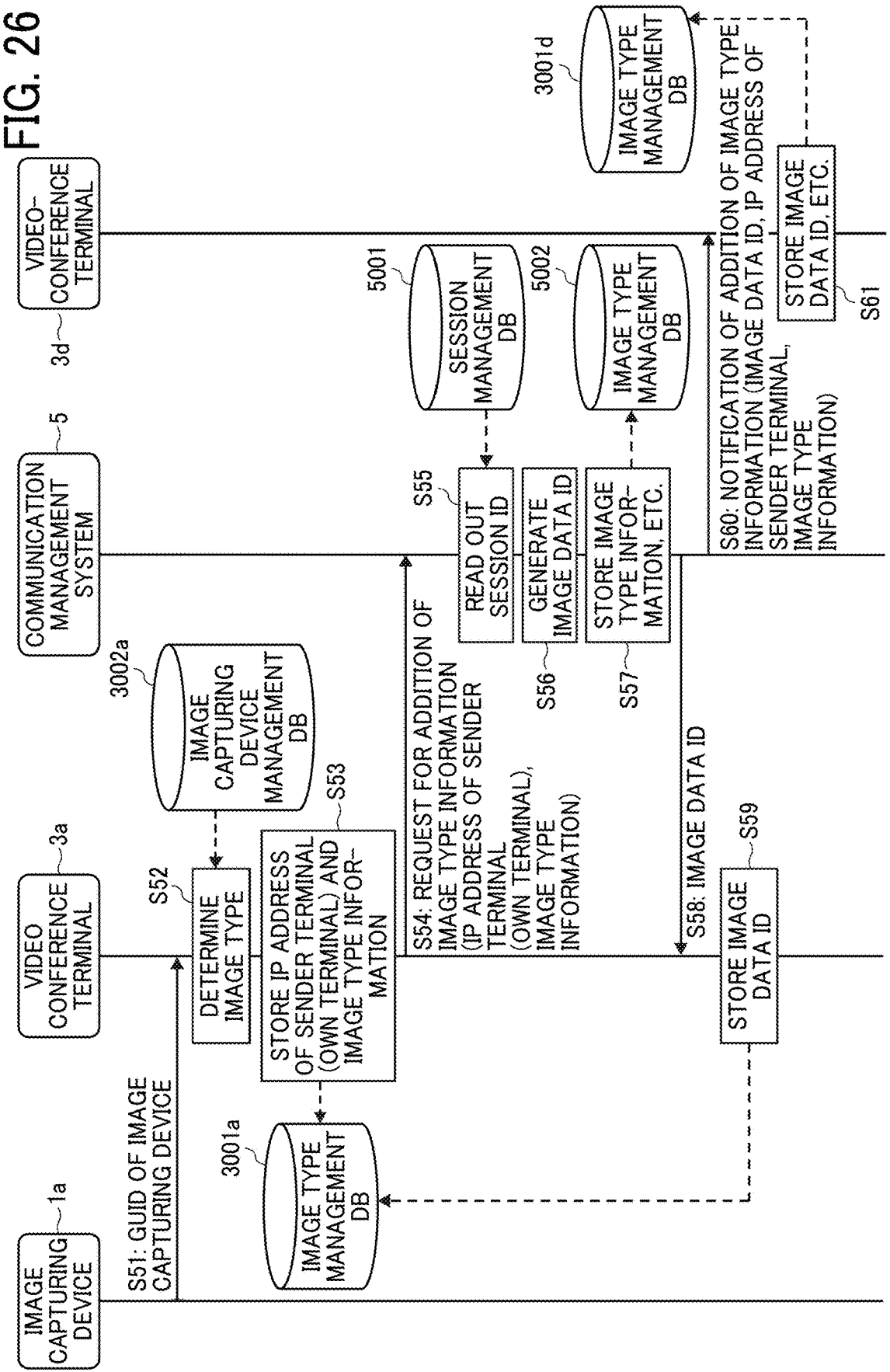
FIG. 26 is a sequence diagram illustrating an operation of managing image type information, according to an embodiment of the present disclosure.

Next, referring to FIG. 26, an operation of managing the image type information is described, according to the embodiment. FIG. 26 is a sequence diagram illustrating an operation of managing the image type information, according to the embodiment.

When a user (e.g., the user A1) in the site A connects the cradle 2a, on which the image capturing device 1a is mounted, to the videoconference terminal 3a, using a wired cable such as a USB cable, the data storage/read unit 19a of the image capturing device 1a reads out the GUID of the own device (e.g., the image capturing device 1a) from the memory 1000a. Then, the communication unit 18a transmits the own device's GUID to the communication unit 38a of the videoconference terminal 3a (step S51). The videoconference terminal 3a receives the GUID of the image capturing device 1a at the communication unit 38a.

Subsequently, the determination unit 35a of the videoconference terminal 3a determines whether a vendor ID and a product ID same as the GUID received in step S51 are stored in the image capturing device management DB 3002a (see FIG. 17) to determine the image type (step S52). More specifically, the determination unit 35a determines that the image capturing device 1a is an image capturing device that captures a special image (a spherical panoramic image, in the embodiment), based on determination that the same vender ID and product ID are stored in the image capturing device management DB 3002a. By contrast, the determination unit 35a determines that the image capturing device 1a is an image capturing device that captures a general image, based on determination that the same vender ID and product ID are not stored in the image capturing device management DB 3002a.

Next, the data storage/read unit 39a stores, in the image type management DB 3001a (FIG. 16), the IP address of the own terminal (i.e., videoconference terminal 3a), which is a sender terminal, in association with the image type information, which is a determination result determined in step S52 (step S53). In this state, any image data ID is not yet associated. Examples of the image type information include a source name, which is determined according to the naming rule, and an image type (general image or special image).

Then, the data exchange unit 31a transmits a request for addition of the image type information to the communication management system 5 (step S54). This request for addition of image type information includes the IP address of the own terminal (videoconference terminal 3a) as a sender terminal, and the image type information, both being stored in step S53 in association with each other. The communication management system 5 receives the request for addition of the image type information at the data exchange unit 51.

Next, the data storage/read unit 59 of the communication management system 5 searches the session management DB 5001 (FIG. 21) using the IP address of the sender terminal received in step S54 as a search key, to read out the session ID associated with the IP address (step S55).

Next, the generator 56 generates a unique image data ID (step S56). Then, the data storage/read unit 59 adds, in the image type management DB 5002 (FIG. 22), a new record associating the session ID that is read out in step S55, the image data ID generated in step S56, the IP address of the sender terminal and the image type information that are received in step S54, with one another (step S57). The data exchange unit 51 transmits the image data ID generated in step S56 to the videoconference terminal 3a. The videoconference terminal 3a receives the image data ID at the data exchange unit 31a (step S58).

Next, the data storage/read unit 39a of the videoconference terminal 3a stores, in the image type management DB 3001a (FIG. 16), the image data ID received in step S58, in association with the IP address of the own terminal (i.e., videoconference terminal 3a) as the sender terminal and the image type information that are stored in step S53 (step S59).

Further, the data exchange unit 51 of the communication management system 5 transmits a notification indicating the addition of the image type information to another communication terminal (videoconference terminal 3d in the embodiment) (step S60). This notification of addition of the image type information includes the image data ID generated in step S56, and the IP address of the own terminal (i.e., videoconference terminal 3a) as the sender terminal and the image type information that are stored in step S53. The videoconference terminal 3d receives the notification indicating the addition of the image type information at the data exchange unit 31d. The destination of the notification transmitted by the data exchange unit 51 is indicated by an IP address associated with the session ID with which the IP address of the videoconference terminal 3a is associated in the session management DB 5001 (FIG. 21). In other words, the destination includes other communication terminal(s) that is (are) in the same virtual conference room where the videoconference terminal 3a is participating.

Next, the data storage/read unit 39d of the videoconference terminal 3d adds, in the image type management DB 3001d (see FIG. 16), a new record associating the image data ID, the IP address of the sender terminal, and the image type information, which are received in step S60 (step S61). In substantially the same manner, the notification indicating the addition of the image type information is transmitted to the smartphone 9 and the PC 7, each of which is another communication terminal. The smartphone 9 and the PC 7 stores the image type information, the image data ID, and the IP address of the sender terminal in the image type management DB 9001 and the image type management DB 7001, respectively. Through the operation as described above, the same information is shared among the communication terminals by being stored in the image type management DB 3001a, the image type management DB3001d, the image type management DB 7001 and the image type management DB 9001.

<Operation of Communicating Captured-Image Data>

Figure 27:
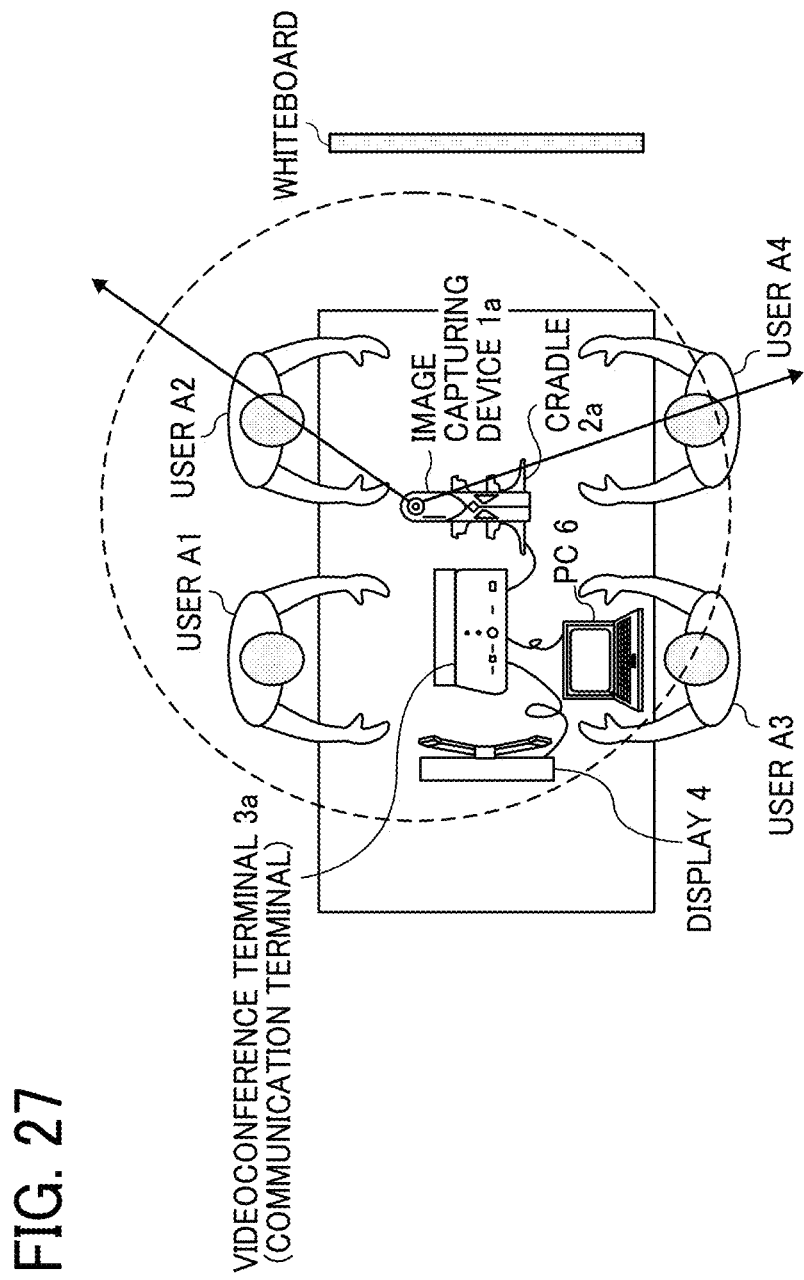
FIG. 27 is an illustration of a state of video communication, according to an embodiment of the present disclosure.

Next, referring to FIG. 27 to FIG. 35, an operation of communicating captured-image data and material image data in video communication is described according to the embodiment. FIG. 27 is an illustration of an example state of video communication performed in the site A.

As illustrated in FIG. 27, the videoconference terminal 3a superimposes a material image generated by the PC 6 on a spherical panoramic image captured by the image capturing device 1a and displays, on the display 4, the spherical panoramic image on which the material image is superimposed. In addition, a whiteboard W, which is illustrated in the right side of FIG. 27, is provided in the site A, and the users A1 to A4 can write characters or pictures on the whiteboard W.

Figure 28:
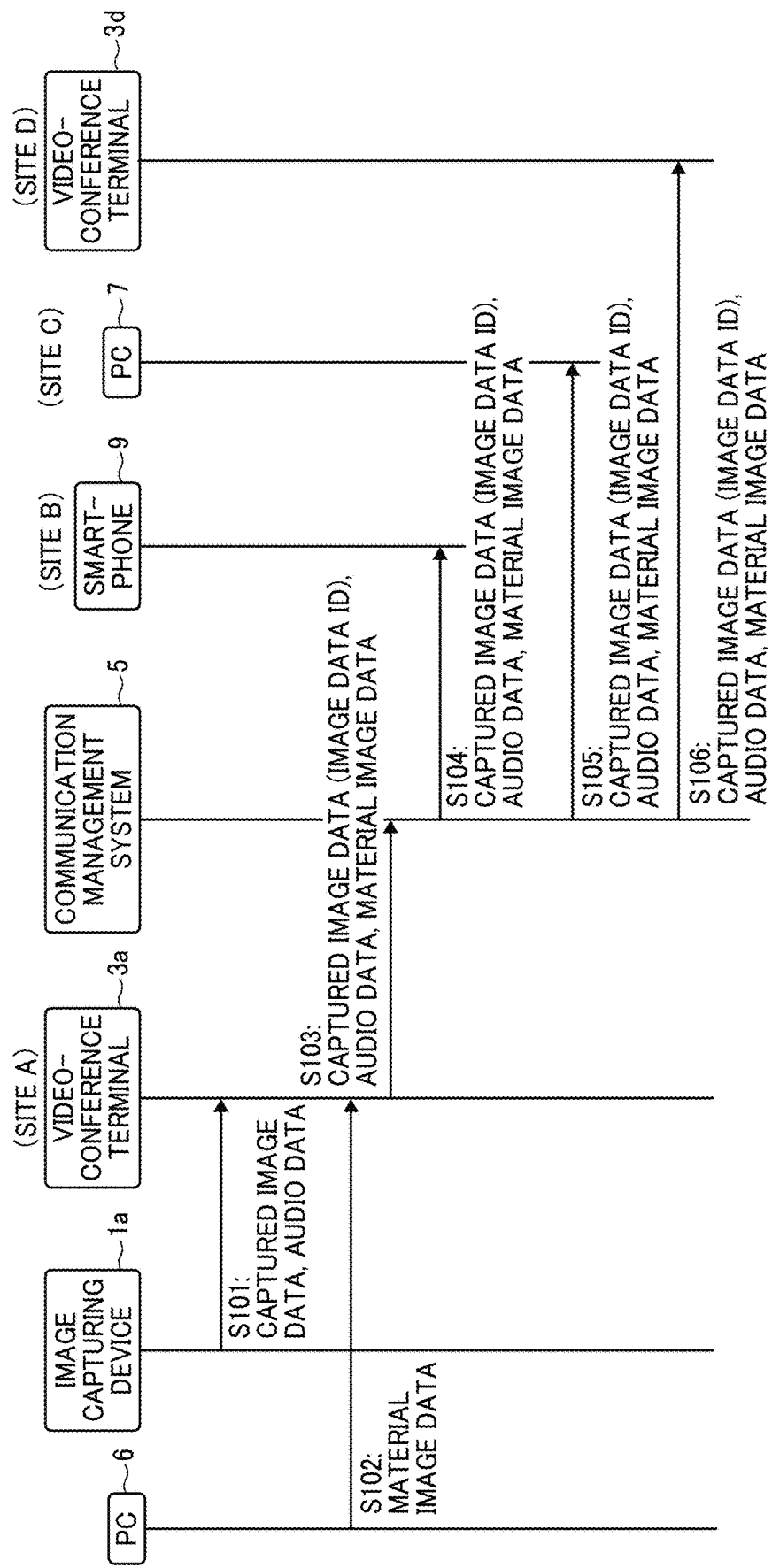
FIG. 28 is a sequence diagram illustrating an operation of transmitting captured-image data, audio data, and material image data in video communication, according to an embodiment of the present disclosure.

Referring to FIG. 28, a description is given of an operation of transmitting captured-image data, audio data and material image data obtained in the site A illustrated in FIG. 27 to each of other communication terminals (smartphone 9, PC 7, and videoconference terminal 3d) via the communication management system 5, according to the embodiment. FIG. 28 is a sequence diagram illustrating an operation of transmitting captured-image data, audio data, and material image data in video communication, according to the embodiment.

The communication unit 18a of the image capturing device 1a transmits captured-image data obtained by capturing a subject or surrounding and audio data obtained by collecting sounds to the communication unit 38a of the videoconference terminal 3a (step S101). Because the image capturing device 1a is a device that is configured to obtain two hemispherical images, from which a spherical panoramic image is generated, the captured-image data is configured by data of the two hemispherical images as illustrated in FIG. 3A and FIG. 3B. The videoconference terminal 3*a* receives the captured-image data and the audio data at the communication unit 38*a*.

Next, the communication unit 68 of the PC 6 transmits the material image data displayed by the display control unit 64 to the communication unit 38*a* of the videoconference terminal 3*a* (step S102).

Next, the data exchange unit 31*a* of the videoconference terminal 3*a* transmits, to the communication management system 5, the captured-image data, the audio data received from the image capturing device 1*a*, and the material image data (step S103). The communication management system 5 receives the captured-image data, the audio data, and the material image data at the data exchange unit 51. In step S103, along with the captured-image data, an image data ID identifying the captured-image data, which is a transmission target, is also transmitted.

Next, the data exchange unit 51 of the communication management system 5 transmits the captured-image data, the audio data, and the material image data to each of other participant communication terminals (i.e., smartphone 9, the PC 7, and the videoconference terminal 3*d*) participating in the same video communication in which the videoconference terminal 3*a* is participating (steps S104, S105, S106). At each of these steps, along with the captured-image data, the image data ID identifying the captured-image data, which is a transmission target, is also transmitted. Accordingly, each of the data exchange unit 91 of the smartphone 9, the data exchange unit 71 of the PC 7 and the data exchange unit 31*d* of the videoconference terminal 3*d* receives the captured-image data and the image data ID, and further receives the audio data and the material image data.

Figure 29A:
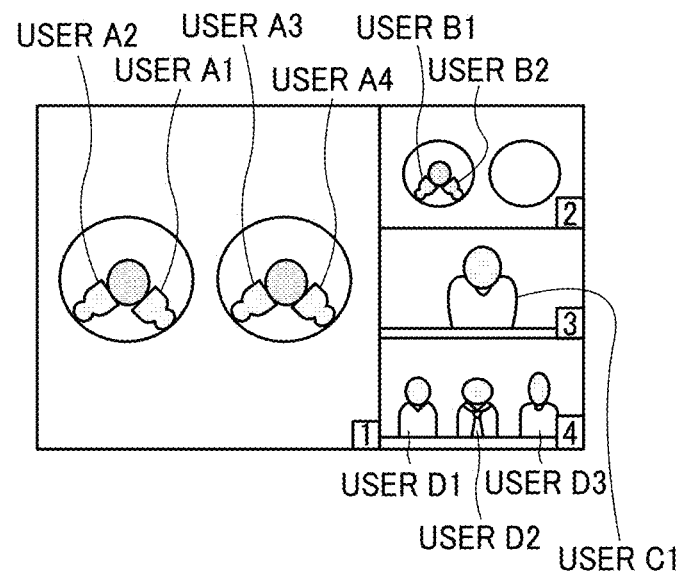
FIG. 29A is an illustration of an example of a screen of a display in one site, in which the display displays images corresponding to captured-image data image data transmitted via the videoconference terminal from the image capturing device of FIGS. 1A to 1C, without generating a spherical panoramic image and a predetermined-area image, according to an embodiment of the present disclosure.
Figure 29B:
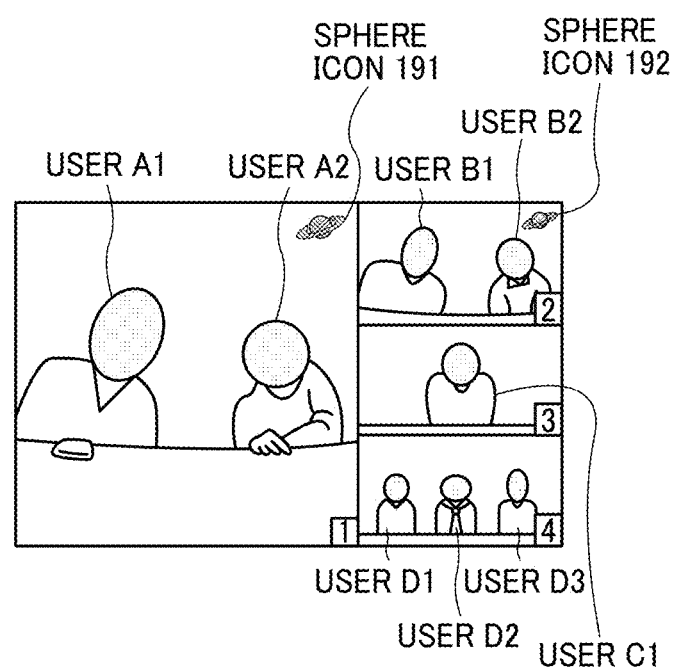
FIG. 29B is an illustration of an example of another screen of the display in one site, in which the display displays a spherical panoramic image and a predetermined-area image generated based on image data transmitted via the videoconference terminal from the image capturing device of FIGS. 1A to 1C, according to an embodiment of the present disclosure.
Figure 29C:
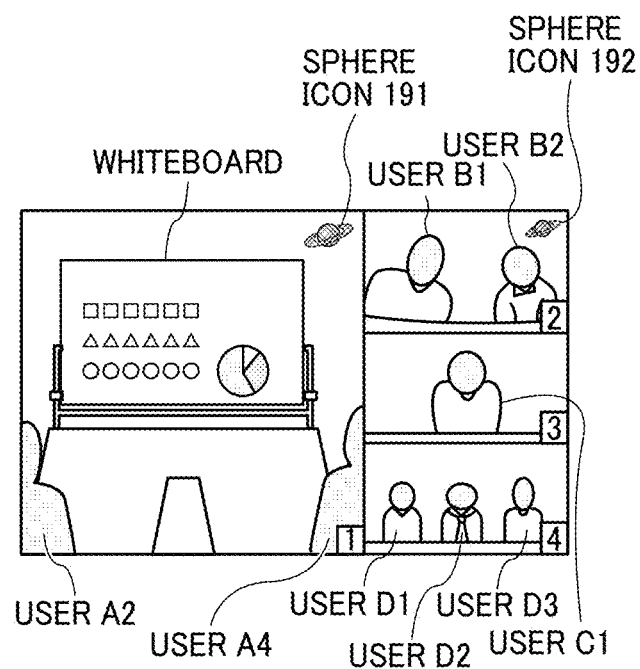
FIG. 29C is illustration of an example of still another screen of a display in one site, in which the predetermined-area image of FIG. 29B is changed, according to an embodiment of the present disclosure.

Next, referring to FIGS. 29A, 29B and 29C, examples of a screen of the display 917 in the site B are described, according to the embodiment. FIGS. 29A, 29B, and 29C are illustrations of examples of a screen displayed on the display 917 in the site B, according to the embodiment. FIG. 29A is an illustration of a screen displayed in the site B, in which the screen includes an image based on captured-image data transmitted from the image capturing device 1*a* in the site A via the videoconference terminal 3*a*, and another image based on captured image-data transmitted from the image capturing device 1*b* in the site B, without generating a spherical panoramic image and a predetermined-area image. On the other hand, FIG. 29B is an illustration of a screen displayed in the site B, in which the screen includes images that are displayed after a spherical panoramic image and a predetermined-area image are generated based on the captured-image data transmitted from the image capturing device 1*a* in the site A and the image capturing device 1*b* in the site B. In the example of FIG. 27A to FIG. 27C, an image of the site A is displayed in a left-side display area (layout number "1") of the display 917, and an image of the site B (own site) is displayed in an upper-right display area (layout number "2"). Further, in a middle-right display area (layout number "3") of the display 917, an image of the site C is displayed, and an image of the site D is displayed in a lower-right display area (layout number "4"). The display area having the layout number "1" is a main display area, and the display areas with the layout numbers "2", "3" and "4" are sub display areas. An image to be displayed in the main display area and an image to be displayed in the sub display area can be switched in each communication terminal. In general, an image in which a main person in the video communication is included is displayed in the main display area at each site.

When captured-image data transmitted from the image capturing device 1*a* and the image capturing device 1*b*, each being configured to capture a spherical panoramic image, are displayed as they are, the images of the site A and the site B are displayed as illustrated in FIG. 29A, i.e., each image is displayed as a combination of a hemispherical image on the front side and a hemispherical image on the back side, as respectively illustrated in FIG. 3A and FIG. 3B.

On the other hand, when the image/audio processor 93 generates a spherical panoramic image based on the captured-image data output from the image capturing device 1*a* and the image capturing device 1*b*, each of which is configured to obtain two hemispherical images from which a spherical panoramic image is generated, and further generates a predetermined-area image, the predetermined-area image, which is a planar image, is displayed as illustrated in FIG. 29B. Further, in both of FIGS. 29A and 29B, a general image (planar image in the present embodiment) is displayed in each of the display areas of the site C and site D, because the image capturing device 8 and the camera 312 built in the videoconference terminal 3*d*, each being an image capturing device that obtains a general image, are used in the site C and the site D, respectively.

Furthermore, a user in each site can change a predetermined area corresponding to the predetermined-area image in the same spherical panoramic image. For example, when the user B1 operates using the touch panel 921, the acceptance unit 92 receives the user operation to shift the predetermined-area image, and the display control unit 94 shifts, rotates, reduces, or enlarges the predetermined-area image. Thereby, a default predetermined-area image in which the user A1 and the user A2 are displayed as illustrated in FIG. 29B, is changeable to another predetermined-area image as illustrated in FIG. 29C, for example. More specifically, in FIG. 29C, the predetermined-area image is changed from one including the users A1 and A2 to another one including the whiteboard w, in the captured image of the site A as illustrated in FIG. 27.

Sphere icons 191 and 192 illustrated in FIGS. 29B and 29C are examples of a special image identification icon indicating that an image being displayed is a predetermined-area image corresponding to the predetermined area T, which is a part of a spherical panoramic image. Although in examples of FIGS. 29B and 29C, each of the sphere icons 191 and 192 is displayed in an upper right corner, in another example, each of the sphere icons 191 and 192 is displayed at any other suitable position such as in an upper left corner, a lower left corner, a lower right corner. In addition, a type of each of the sphere icons 191 and 192 is not limited to the one illustrated in FIG. 29B and FIG. 29C. Further, in alternative to or in addition to the sphere icons 191 and 192, a character string such as "Spherical Image", or a combination of the icon and characters can be used.

Figure 30:
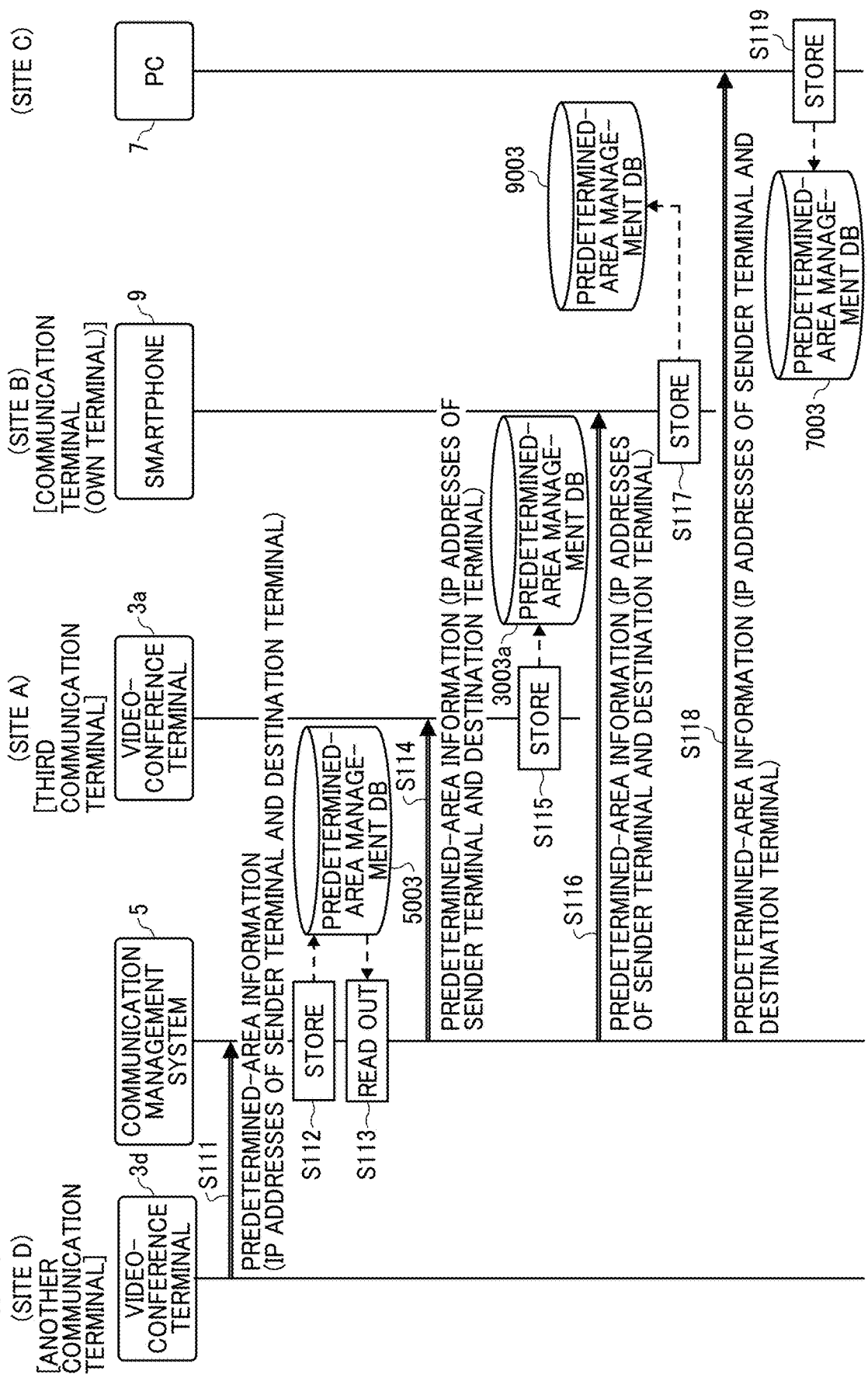
FIG. 30 is a sequence diagram illustrating an operation of sharing the predetermined-area information, according to an embodiment of the present disclosure.

Referring to FIG. 30, an operation performed by the image communication system is described, when a predetermined-area image as illustrated in FIG. 29B is displayed and the predetermined-area image is changed from the one illustrated in FIG. 29B to another one illustrated in FIG. 29C. FIG. 30 is a sequence diagram illustrating an operation of sharing predetermined-area information. In FIG. 30, the videoconference terminal 3*a* in the site A is an example of a third communication terminal, the videoconference terminal 3*d* in the site D is an example of another communication terminal, and the smartphone 9 in the site B is an example of a communication terminal (own terminal).

First, when the user D1, D2 or D3 operates the videoconference terminal 3*d* in the site D to display the predetermined-area image of the site A as illustrated in FIG. 29B, the data exchange unit 31*d* of the videoconference terminal 3*d* transmits, to the communication management system 5, predetermined-area information indicating the predetermined-area image currently being displayed (step S111). This predetermined-area information includes the IP address of the videoconference terminal 3*a*, which is a sender terminal of the captured-image data, and the IP address of the videoconference terminal 3*d*, which is a destination terminal of the captured-image data. In this example, the videoconference terminal 3*d* is also a sender terminal of the predetermined-area information. Thus, the data exchange unit 51 of the communication management system 5 receives the predetermined-area information.

The data storage/read unit 59 of the communication management system 5 stores, in the predetermined-area management DB 5003 (FIG. 23), the predetermined-area information and the IP address of the sender terminal and the IP address of the destination terminal, which are received at step S111, in association with one another (step S112). The processes in steps S111 and 112 are performed each time the predetermined-area image is changed in the videoconference terminal 3*d*, for example, from the one as illustrated in FIG. 29B to another one as illustrated in FIG. 29C.

The data storage/read unit 59 of the communication management system 5 reads out, from a plurality of sets of the predetermined-area information and the IP address of each of the sender terminal and the destination terminal stored in the predetermined-area management DB 5003, the latest (the most recently stored) set of predetermined-area information and the IP address of each of the sender terminal and the destination terminal, at preset intervals such as every thirty seconds (step S113). Next, the data exchange unit 51 distributes (transmits) the predetermined-area information including the IP addresses read in step S113, to other communication terminals (the videoconference terminal 3*a*, the smartphone 9, the PC 7) participating in the same video communication in which the videoconference terminal 3*d*, which is the sender terminal of the predetermined-area information, is participating (steps S114, S116, S118). The videoconference terminal 3*a* receives the predetermined-area information and the IP addresses at the data exchange unit 31*a*. The data storage/read unit 39*a* stores, in the predetermined-area management DB 3003*a* (FIG. 18), the predetermined-area information and the IP addresses received in step S114 in association with one another (step S115). In substantially the same manner, the smartphone 9 receives the predetermined-area information and the IP addresses at the data exchange unit 91. The data storage/read unit 99 stores, in the predetermined-area management DB 9003 (FIG. 18), the predetermined-area information and the IP addresses received in step S116 in association with one another (step S117). Further, PC 7 receives the predetermined-area information and the IP addresses at the data exchange unit 71. The data storage/read unit 79 stores, in the predetermined-area management DB 7003 (FIG. 18), the predetermined-area information received in step S118 in association with the IP addresses that are also received in step S118 (step S119).

Figure 31:
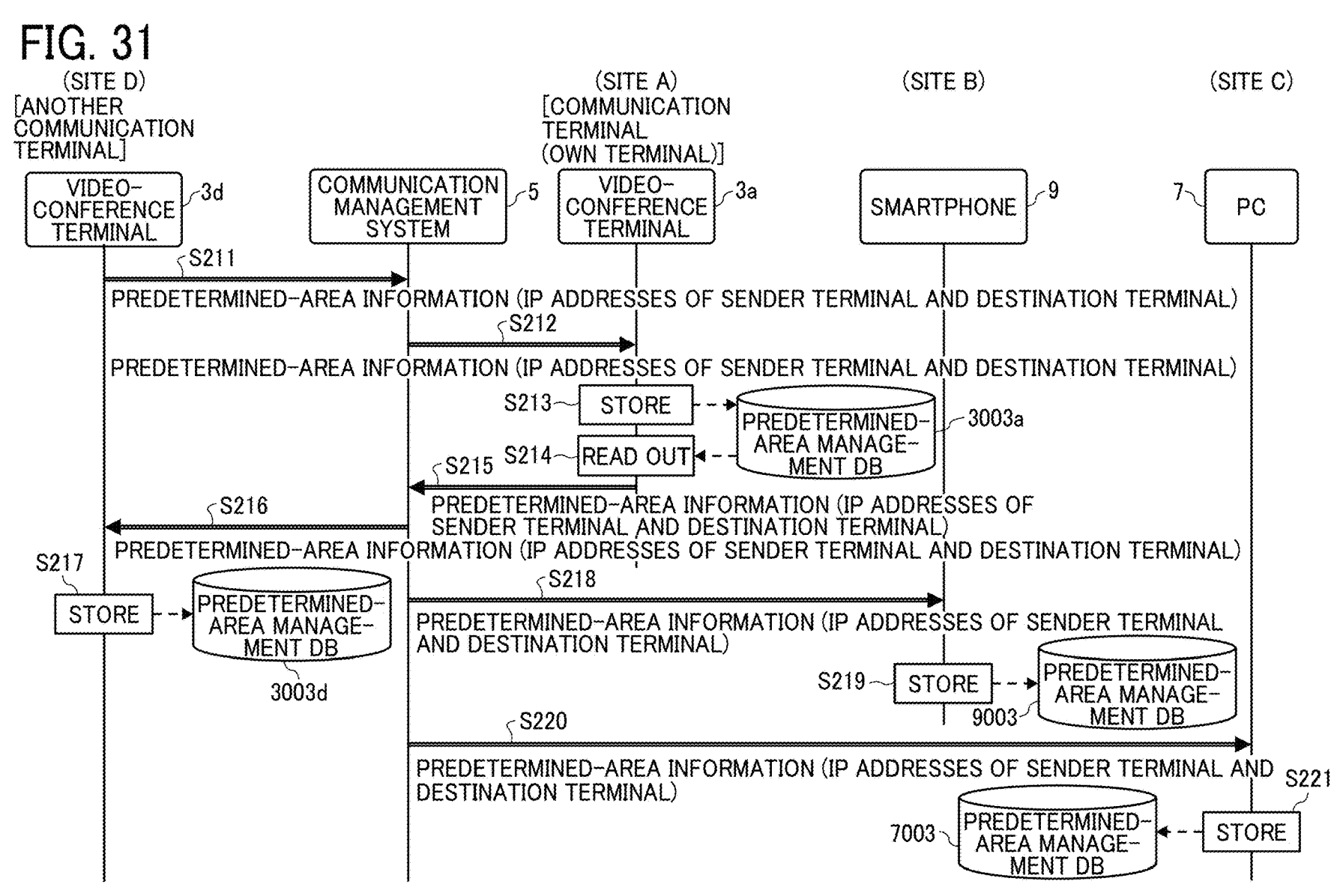

Referring to FIG. 31, another operation of sharing predetermined-area information is described according to the embodiment. FIG. 31 is a sequence diagram illustrating another example of an operation of sharing predetermined-area information described above referring to FIG. 30. In FIG. 31, the videoconference terminal 3*a* in the site A is an example of a communication terminal (own terminal), and the videoconference terminal 3*d* in the site D is an example of another communication terminal.

In the operation described above referring to FIG. 30, the communication management system 5 once stores predetermined-area information transmitted from any one of the communication terminals (see step S112) and transmits the predetermined-area information at regular intervals to each of the other communication terminals other than the communication terminal that transmits the predetermined-area information (see steps S114 to S119). By contrast, in the operation illustrated in FIG. 32, not the communication management system 5 but any one of the communication terminals (the videoconference terminal 3*a*, in this example) as a sender terminal of captured-image data once stores predetermined-area information (see step S213), and transmits the predetermined-area information to each of the other communication terminals than the own terminal (the videoconference terminal 3*a*) at regular intervals (see steps S215 to S221). In other words, in this example, a communication terminal as a sender terminal of captured-image data manages how a predetermined-area image representing the predetermined area T1 is displayed by each of the other communication terminals based on the captured-image data transmitted from the own terminal (the videoconference terminal 3*a*, in this example).

The operation illustrated in FIG. 31 is implemented by a common hardware configuration that implements the operation illustrated in FIG. 30. Therefore, a description of a hardware configuration for implementing the operation illustrated in FIG. 31 is omitted.

In the operation illustrated in FIG. 31, firstly, when the user D1, D2 or D3 operates the videoconference terminal 3*d* in the site D to display a predetermined-area image of the site A, the data exchange unit 31*d* of the videoconference terminal 3*d* transmits, to the communication management system 5, predetermined-area information indicating the predetermined-area image currently being displayed (step S211). This predetermined-area information includes the IP address of the videoconference terminal 3*a*, which is a sender terminal of the captured-image data, and the IP address of the videoconference terminal 3*d*, which is a destination terminal of the captured-image data. In this example, the videoconference terminal 3*d* is also a sender terminal of the predetermined-area information. Thus, the data exchange unit 51 of the communication management system 5 receives the predetermined-area information.

Next, the data exchange unit 51 of the communication management system 5 transmits the predetermined-area information including the IP addresses received in step S211 to the videoconference terminal 3*a*, which is a sender terminal of the captured-image data (step S212). The videoconference terminal 3*a* receives the predetermined-area information including the IP addresses at the data exchange unit 31*a*.

Next, the data storage/read unit 39*a* of the videoconference terminal 3*a* stores, in the predetermined-area management DB 3003*a*, the predetermined-area information, the IP address of the sender terminal and the IP address of the destination terminal, which are received at step S212, in association with one another (step S213). This process of step S213 is a process of managing how the captured-image data transmitted from the own terminal (videoconference terminal 3*a*, in this example) is displayed in each of the other communication terminals. The processes in steps S211 to S213 are performed each time the predetermined-area image is changed in the videoconference terminal 3d.

The data storage/read unit 39a of the videoconference terminal 3a reads out, from a plurality of sets of the predetermined-area information and the IP address of each of the sender terminal and the destination terminal stored in the predetermined-area management DB 3003a, the latest (the most recently stored) set of predetermined-area information and the IP address of each of the sender terminal and the destination terminal, at preset intervals such as every thirty seconds (step S214). Then, the data exchange unit 31a transmits the predetermined-area information including the IP addresses read out in step S214 to the communication management system 5 (step S215). The communication management system 5 receives the predetermined-area information including the IP addresses at the data exchange unit 51.

Next, the data exchange unit 51 of the communication management system 5 transmits (distributes) the predetermined-area information including the IP addresses received in step S215 to each of the communication terminals (videoconference terminal 3d, smartphone 9, PC 7) (steps S216, S218, S220). The videoconference terminal 3d receives the predetermined-area information including the IP addresses at the data exchange unit 31d. The data storage/read unit 39d stores, in the predetermined-area management DB 3003d, the predetermined-area information received in step S216 in association with the IP addresses that are also received in step S216 (step S217). In substantially the same manner, the smartphone 9 receives the predetermined-area information and the IP addresses at the data exchange unit 91. The data storage/read unit 99 stores, in the predetermined-area management DB 9003, the predetermined-area information received in step S218 in association with the IP addresses that are also received in step S218 (step S219). Further, PC 7 receives the predetermined-area information and the IP addresses at the data exchange unit 71. The data storage/read unit 79 stores, in the predetermined-area management DB 7003, the predetermined-area information received in step S220 in association with the IP addresses that are also received in step S220 (step S221).

Thus, the predetermined-area information indicating the predetermined-area image changed in the site A is transmitted to each of the communication terminals in the other sites B, C and D participating in the same video communication. As a result, the predetermined-area information indicating the predetermined-area image being displayed in the site A is shared by the other communication terminals in the other sites B, C and D. This operation is performed in substantially the same manner, when the predetermined-area image being displayed at any one of the communication terminals in the sites B, C, and D is changed. Accordingly, the predetermined-area information indicating the predetermined-area image being displayed by the communication terminal in any one of the sites is shared by the other communication terminals in the other sites which are participating in the same video communication.

Figure 32:
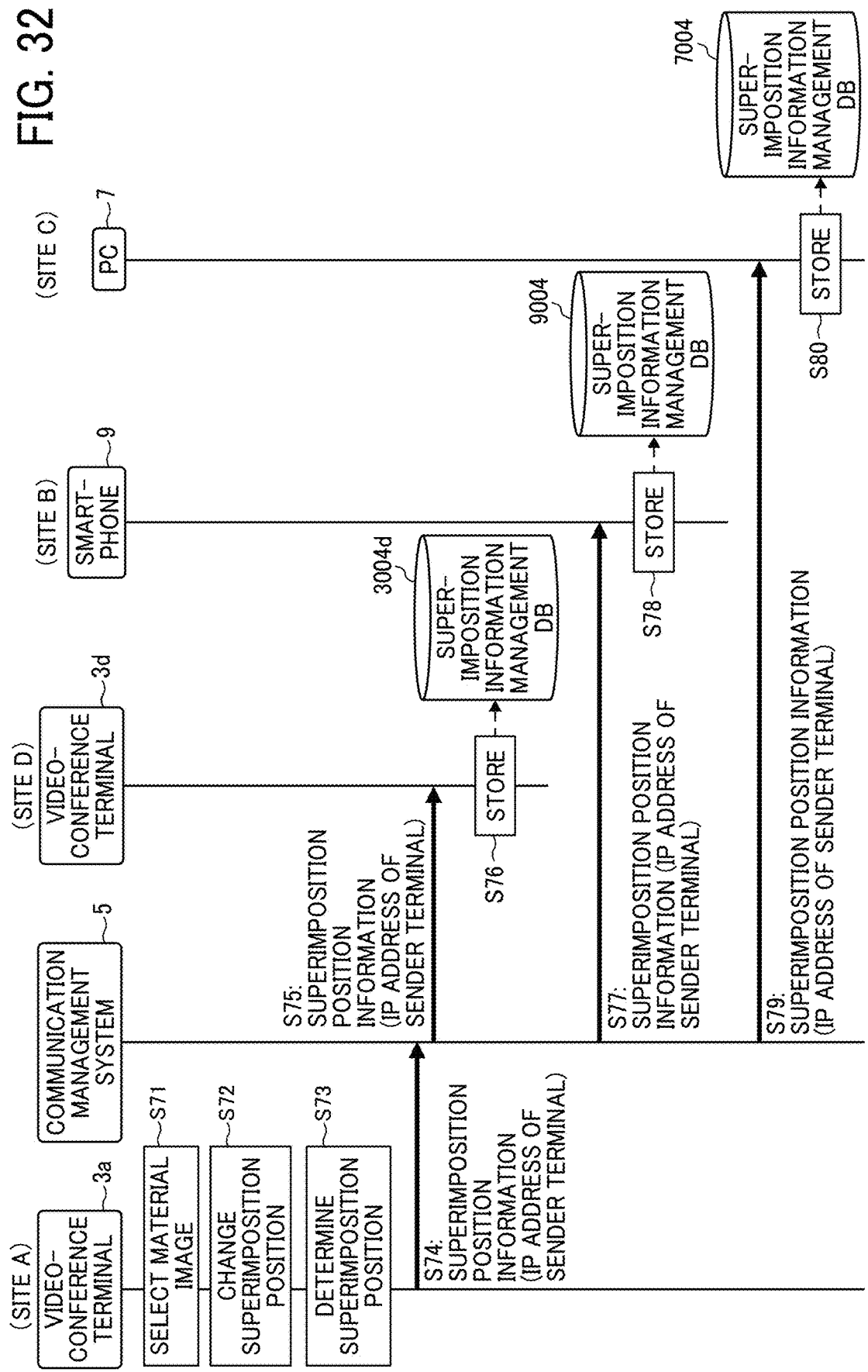
FIG. 32 is a sequence diagram illustrating an operation of sharing superimposition position information, according to an embodiment of the present disclosure.

Hereinafter, referring to FIGS. 32 to 35, a description is given of setting of a superimposition position of a material image. FIG. 32 is a sequence diagram illustrating an operation performed by the image communication system. More specifically, FIG. 32 is a sequence diagram illustrating an operation performed when the videoconference terminal 3a, which is a transmission source of an image and provided in the site A, changes a superimposition position at which a material image is to be superimposed on a spherical panoramic image.

First, the acceptance unit 32a receives selection of a material image according to an operation by the users A1, A2, A3 or A4 in the site A (step S71). For example, the users A1, A2, A3 or A4 select the material image by right clicking, double clicking, or pressing a corresponding key on the material image displayed in a preview screen of the spherical panoramic image being distributed from the videoconference terminal 3a. In a case where a terminal including a touch panel as an input device is used, the user can select the material image by long tapping or double tapping the material image displayed in the preview screen. Next, the acceptance unit 32a receives a change of a superimposition position of the material image according to an operation by the user A1, A2, A3 or A4 (step S72).

Next, the acceptance unit 32a receives determination of the superimposition position of the material image according to an operation by the user A1, A2, A3 or A4, and the calculation unit 37a generates superposition position information (step S73). For example, the acceptance unit 32a receives that the superimposition position is determined automatically after the operation at step S72. In another example, the acceptance unit 32a receives the determination of the superimposition position according to the user operation of pressing an "Enter" button on the screen or pressing a preset key.

Figure 33:
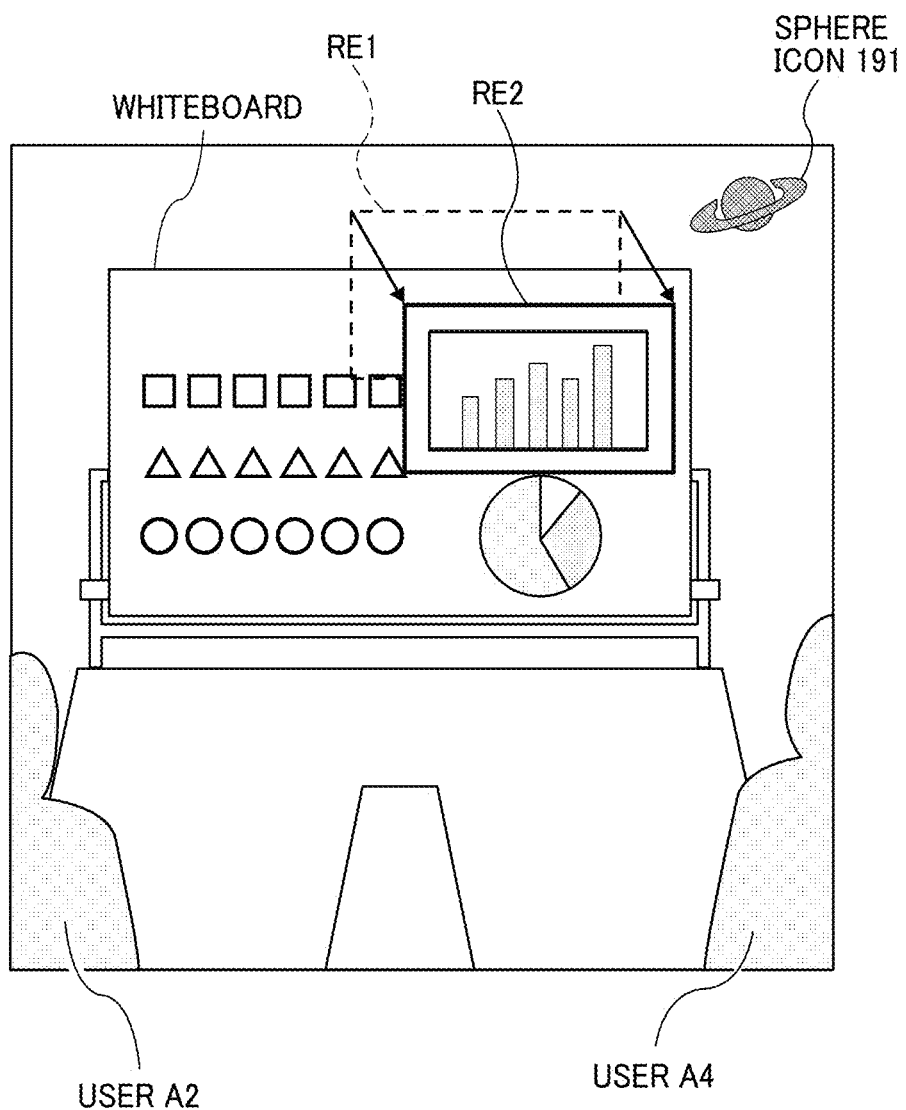
FIG. 33 is an illustration of an example of a screen displayed when the superimposition position is changed, according to an embodiment of the present disclosure.

Referring to FIG. 33, a description is given of an example of a screen displayed when the user A1, A2, A3 or A4 changes the superimposition position of the material image. FIG. 33 is an illustration of an example of a preview screen of a spherical panoramic image in the site A. In the embodiment, the preview screen refers to a screen viewed by a user in a given site so that the user confirms video that is distributed by a communication terminal provided in the given site without using the communication network 100. As illustrated in FIG. 33, in the preview screen, a predetermined-area image is displayed, which is a part of the spherical panoramic image and includes the user A2, the user A4, and the whiteboard W. Characters and pie chart are written on the whiteboard W.

Further, in FIG. 33, the preview screen also displays a region RE1 surrounded by a dotted line and a region RE2 surrounded by a solid line. The region RE1 and the region RE2 respectively indicate the superimposition position before the change and the superimposition position after the change. By changing the superimposition position of the material image from the region RE1 to the region RE2, which is within an area of the whiteboard W, a bar chart, which is the material image displayed by the PC 6, is displayed next to or close to the characters and the pie chart written on the whiteboard W. This makes the preview screen including the material image more suitable for viewing to the participants in the conference. Referring to FIG. 33, operations by the user A1, A2, A3 or A4 are described, in association with steps S71 to S73 described above. The user A1, A2, A3 or A4 selects the region RE1 (step S71), and then drags and drops in a direction indicated by arrows in FIG. 33 to change the superimposition position of the material image (step S72). Then, the user A1, A2, A3 or A4 performs an operation for determining the superimposition position after the change while the material image is positioned at the region RE2, which is a position desired by the user A1, A2, A3 or A4 (step S73).

The "drag and drop" described above with reference to FIG. 33 is one example of a user operation for changing the superimposition position, and not limited thereto. The superimposition position can be changed by any other suitable operation. For example, the superimposition position can be changed by changing coordinates of a start point and an end point of an image to be superimposed through a predetermined key operation. In another example, the superimposition position can be changed by pinch-in operation or pinch-out operation when a device configured to receive a touch input is used. In still another example, when a size of the material image varies before and after the change, that is, the size of the region RE1 and the size of the region RE2 are different from each other, the enlargement or reduction is performed so as to fit within the changed size. The frame of the dotted line indicating the region RE1 and the arrow can be displayed for assisting the user's operation. In another example, such frame or arrow can be omitted.

Referring again to FIG. 32, the communication unit 38a transmits, to the data exchange unit 51 of the communication management system 5, the superimposition position information after the change (step S74). This superimposition position information includes superimposition position coordinates, the IP address of the videoconference terminal 3a, which is a sender terminal of the captured-image data and a sender terminal of the superimposition position information. In this example, the videoconference terminal 3d can be also a sender terminal of the superimposition position information with respect to another terminal. The communication management system 5 receives the superimposition position information at the data exchange unit 51.

Next, the data exchange unit 51 distributes (transmits) the superimposition position information to other communication terminals, such as the videoconference terminal 3d, the smartphone 9, the PC 7 participating in the same video communication in which the videoconference terminal 3a, which is the sender terminal of the superimposition position information, is participating (steps S75, S77, S79). The videoconference terminal 3d receives the superimposition position information at the data exchange unit 31d. Then, the data storage/read unit 39a stores the superimposition position information received in step S75 in the superimposition position management DB 3004d (FIG. 19) in association with the IP address of the sender terminal (step S76). In substantially the same manner, the smartphone 9 receives the superimposition position information at the data exchange unit 91. Then, the data storage/read unit 99 stores the superimposition position information received in step S77 in the superimposition position management DB 9004 (FIG. 19) in association with the IP address of the sender terminal (step S78). Further, the PC 7 receives the superimposition position information at the data exchange unit 71. The data storage/read unit 79 stores, in the superimposition position management DB 7004 (FIG. 19), the superimposition position information received in step S79 in association with the IP address that is also received in S79 (step S80).

Figure 34:
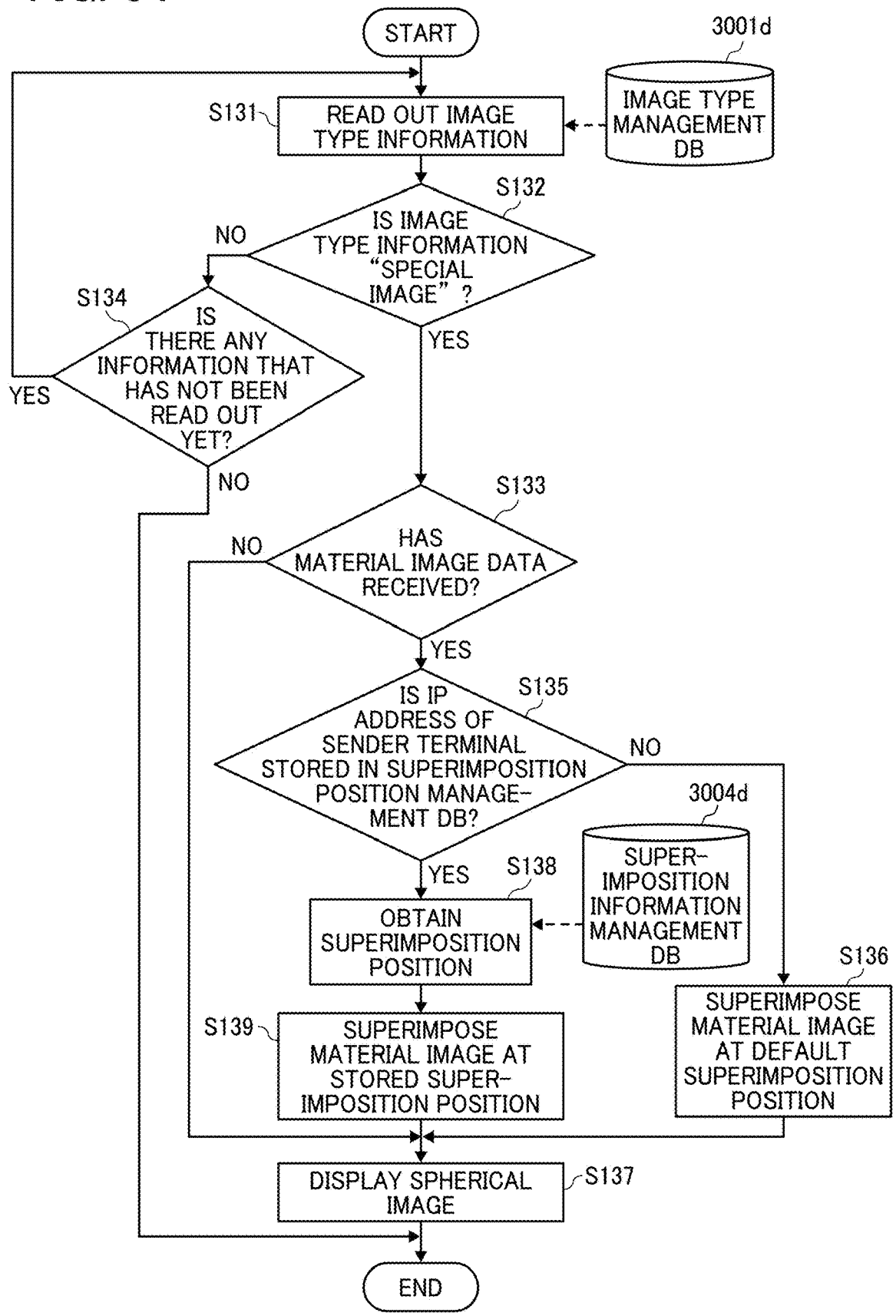
FIG. 34 is a flowchart illustrating steps in an operation of displaying a superimposed image, according to an embodiment of the present disclosure.

FIG. 34 is a flowchart illustrating steps in an operation of displaying a material image at a receiver terminal side, according to the present embodiment. Since the same or the substantially the same operation is performed at each of the receiver terminals (smartphone 9, the PC 7, and videoconference terminal 3d), an operation performed by the smartphone 9 in the site B is described, as an example.

First, the data storage/read unit 99 of the smartphone 9 searches the image type management DB 9001 (FIG. 16) using the image data ID received in step S104 in the process illustrated in FIG. 28 as a search key, to read out the image type information (source name) associated with the image data ID (step S131).

Next, the determination unit 95 determines whether the image type information read in step S131 indicates "special image" or not (step S132). When the determination result of step S132 indicates that the image type information does not indicate a special image (S132: NO), the operation proceeds to step S134. In step S134, the determining unit 95 determines whether there is image type information that has not been read yet. When the determination unit 95 determines that there is no image type information that has not been read yet (S134: NO), the operation ends. By contrast, when the determination unit determines that there is image type information that has not been read yet (S134: YES), the operation returns to step S131.

By contrast, when the determination result of step S132 indicates that the image type information indicates a special image (S132: YES), the determination unit 95 checks whether the material image data is received or not (step S133).

For example, in step S133, when there is image data that is not managed by the image data ID, the determination unit 95 determines that the image data is material image data. When the determination result of step S133 indicates that no material image data is received (S133: NO), the image/audio processor 93 displays the spherical image, and the operation ends (step S137).

By contrast, when the determination result of step 133 indicates that material image data is received (S133: YES), the determination unit 95 determines whether the IP address of the sender terminal of the captured-image data is stored in the superimposition position management DB 9004 (step S135). When the determination result of step S135 indicates that the IP address of the captured-image data is not stored (S135: NO), the image/audio processor 93 superimposes the material image data on the spherical image at an initial superimposition position (default superimposition position), which is a predetermined superimposition position in the spherical image (S136). Then, the image/audio processor 93 displays the spherical image on which the material image data is superimposed (step S137).

When the determination result of step S135 indicates that the IP address of the sender terminal is stored (S135: YES), the data storage/read unit 99 obtains the superimposition position from the superimposition position management DB 9004 (step S138). Next, the image/audio processor 93 superimposes the material image data on the spherical image at the obtained superimposition position (step S139). Then, the image/audio processor 93 displays the spherical image on which the material image data is superimposed (step S137).

Figure 35:
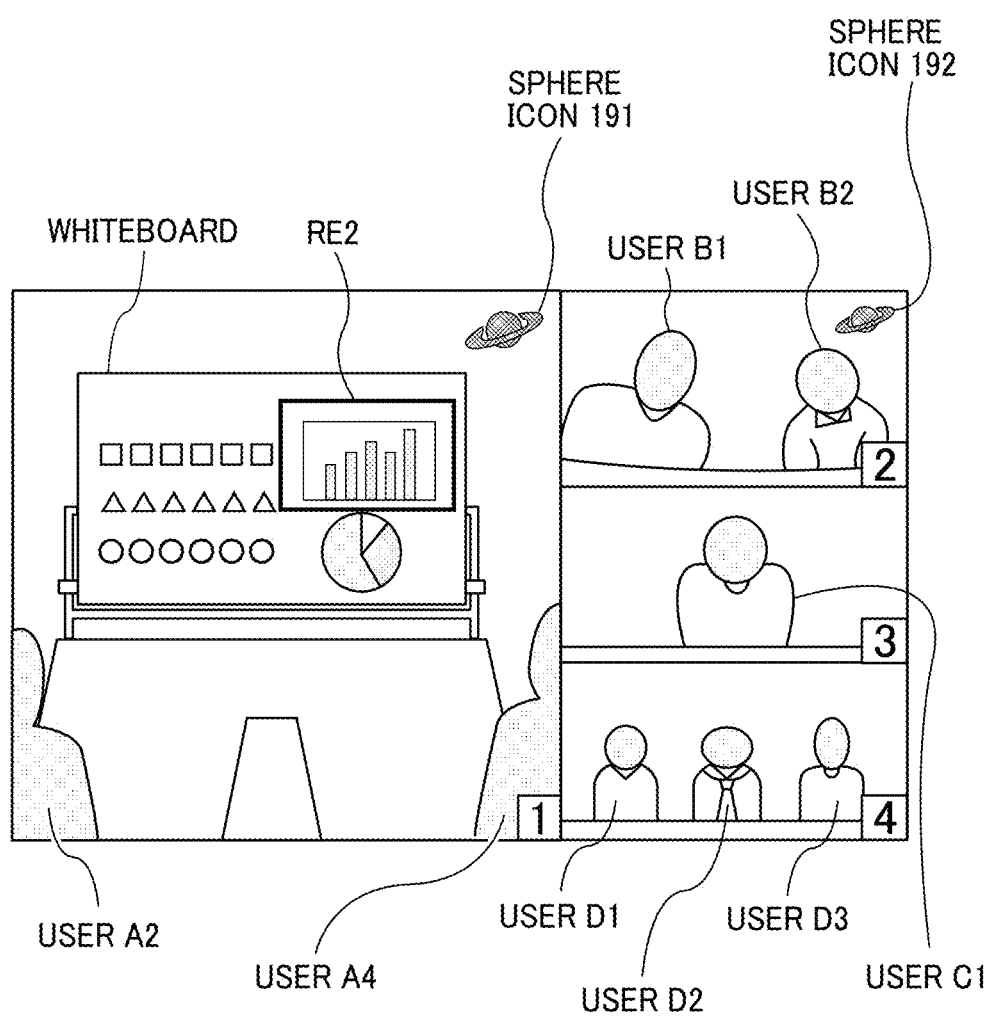
FIG. 35 is an illustration of an example of a display displaying a superimposed image at a site, according to an embodiment of the present disclosure.

FIG. 35 is an example of a display screen displayed by the smartphone 9 in the site B when the display process described with reference to FIG. 34 is performed. As illustrated in FIG. 35, at the smartphone 9 in the site B, the material image is displayed in the region RE2, which is the superimposition position changed in the site A as described above with reference to FIG. 33.

As described, the superimposition position information changed by the videoconference terminal 3a in the site A is transmitted to each of the communication terminals in the other sites B, C and D participating in the same video communication. Accordingly, the material image being displayed by the videoconference terminal 3a in the site A is displayed by each of the communication terminals in the other sites B, C and D, at the same position where the material image is displayed by the videoconference terminal 3a in the site A.

Figure 36:
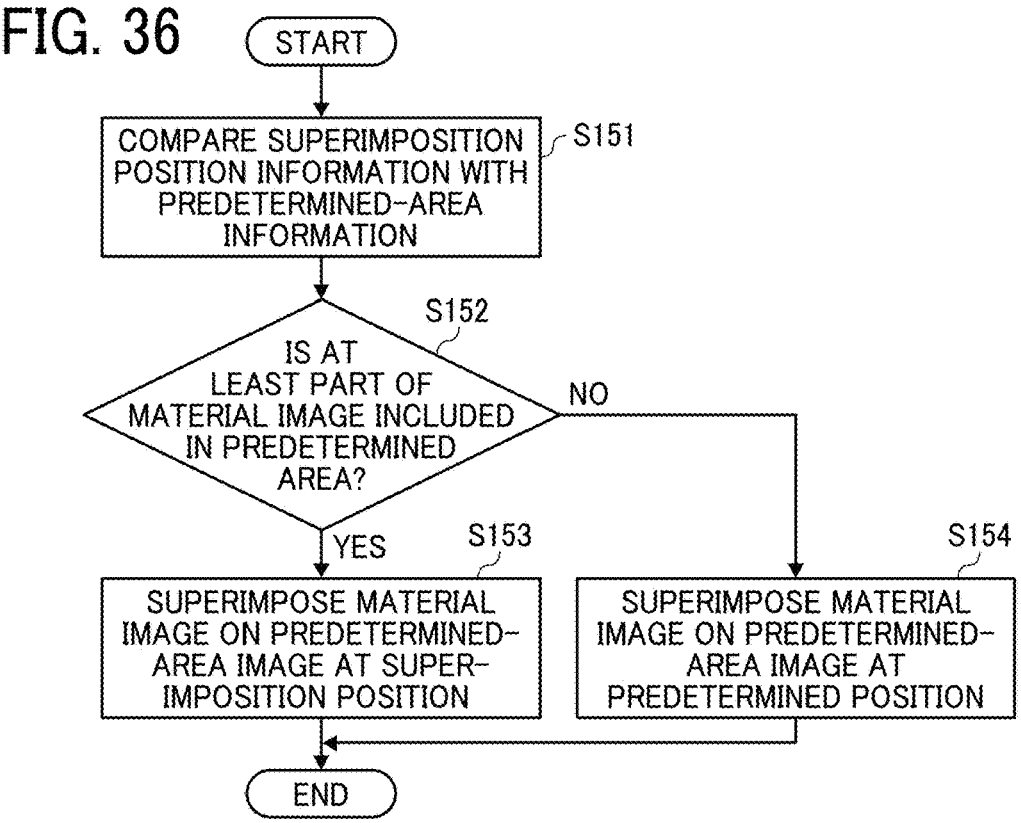
FIG. 36 is a flowchart illustrating steps in an operation of superimposing a material image on a predetermined-area image, according to an embodiment of the present disclosure.

FIG. 36 is a flowchart illustrating an operation performed when the smartphone 9 as a receiver terminal in the site B superimposes a material image on a predetermined-area image.

First, the determination unit 95 of the smartphone 9 as a receiver terminal provided in the site B compares the superimposition position information received by the data exchange unit 91 with the predetermined-area information indicating a predetermined-area image currently being displayed (step S151).

Next, the determination unit 95 determines whether at least a part of the material image is included in the predetermined area (step S152). When the determination unit 95 determines that at least a part of the material image is included in the predetermined area (S152: YES), the image/audio processor 93 superimposes the material image on the predetermined-area image at the superimposition position in the predetermined-area image (step S153).

Figure 37:
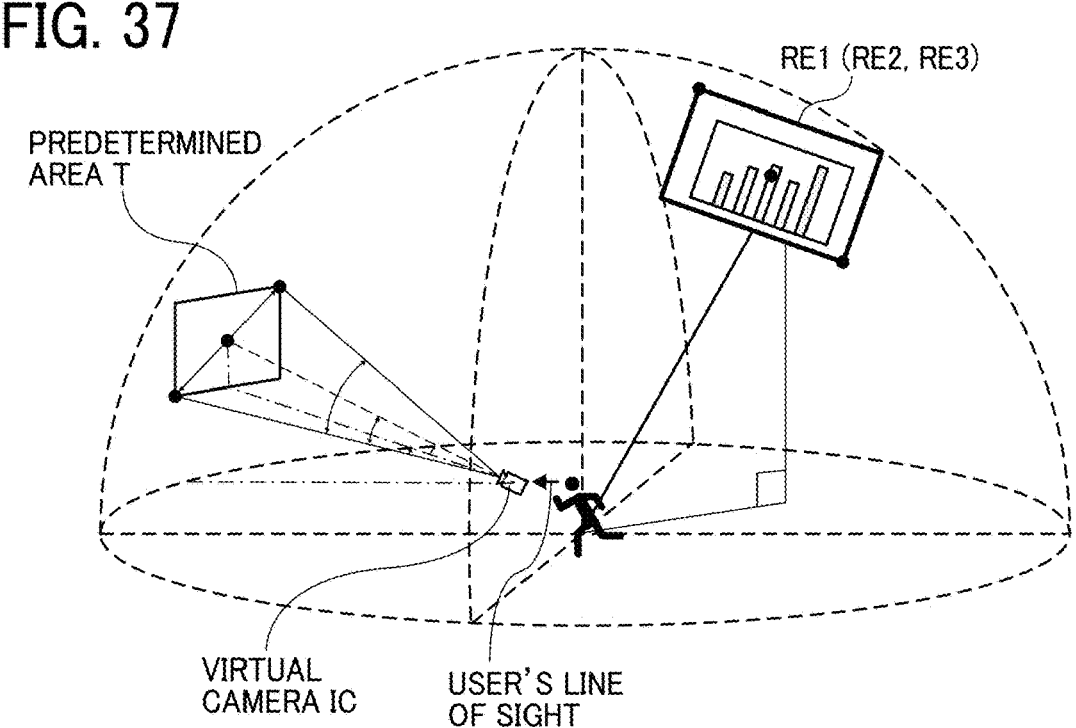
FIG. 37 is an illustration illustrating relative positions of a predetermined-area image and a material image in a spherical image, according to an embodiment of the present disclosure.
Figure 38:
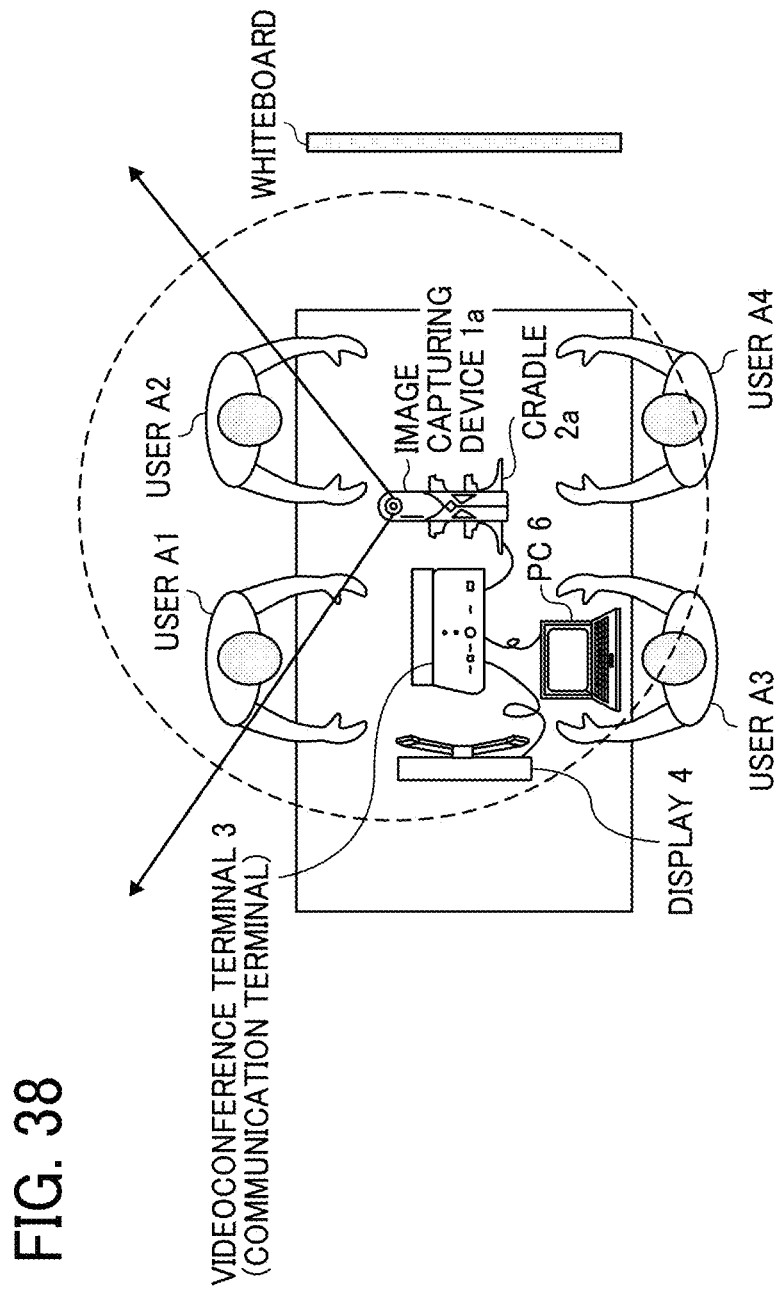
FIG. 38 is a diagram illustrating a predetermined area after change, according to an embodiment of the present disclosure.
Figure 39:
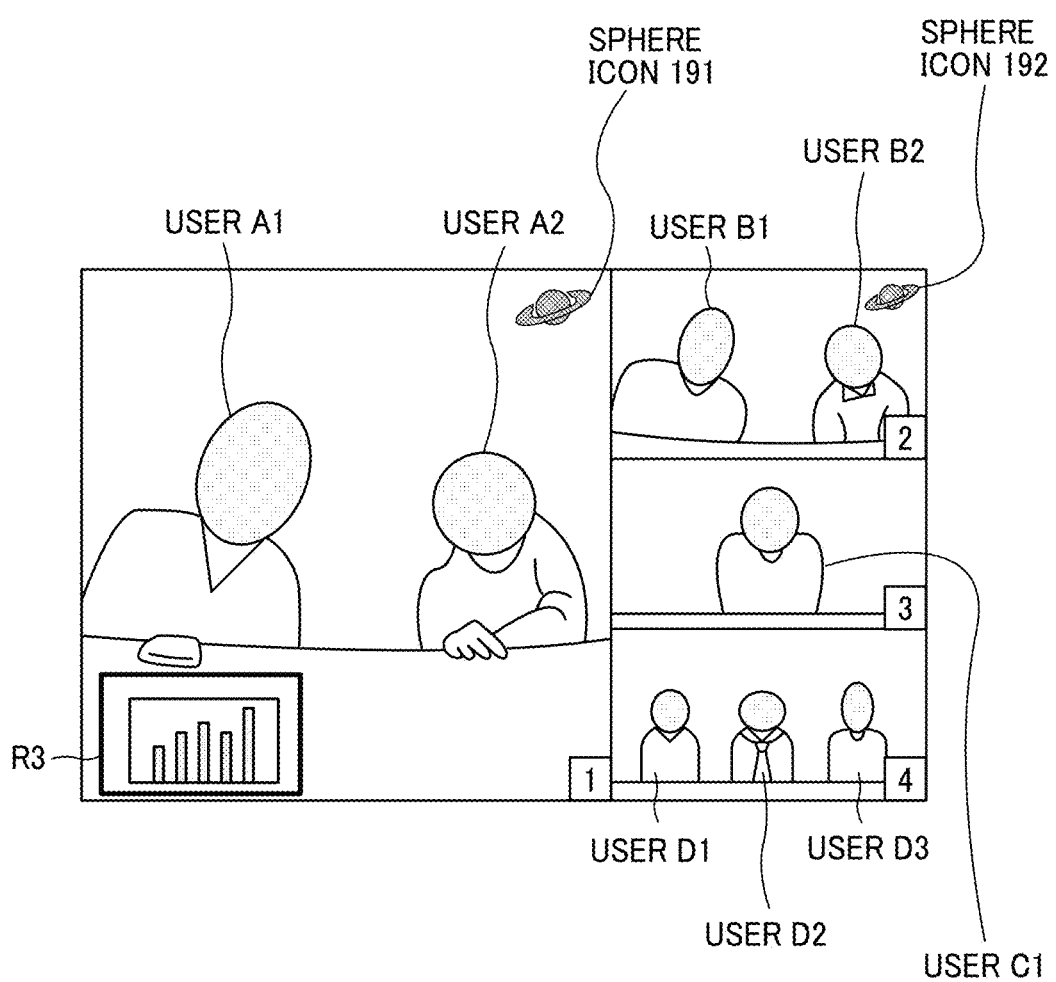
FIG. 39 is a diagram illustrating a predetermined-area image including a material image, according to an embodiment of the present disclosure.

By contrast, when the determination unit 95 determines that at least a part of the material image is not included in the predetermined area (S152: NO), the image/audio processor 93 superimposes the material image on the predetermined-area image at a predetermined position in the predetermined-area image (step S154). This predetermined position is set by a designer or a user, for example. FIG. 37 illustrates relative positions of a predetermined-area image and a material image in a spherical image. As illustrated in FIG. 37, the user's point of gaze for the predetermined area viewed from the virtual camera IC does not always match the user's point of gaze for the superimposition position viewed from the virtual camera IC. For this reason, if the users A1 and A2 are included in the predetermined-area image as illustrated in FIG. 38, a material image that the user in the site A on the transmitting side wants to present may not be displayed by the terminals provided in other sites. To address this issue, in the present embodiment, in step S154, a material image R3 is displayed at the predetermined position (a lower left corner of the screen in the present embodiment) of the predetermined-area image.

Further, the users B1 and B2 in the site B can change the predetermined position where the material image R3 is to be superimposed by using the touch panel 921. In this case, the acceptance unit 92 receives the change of the predetermined position, and the image/audio processor 93 superimposes the material image on the changed predetermined position.

As described heretofore, according to the present embodiment, through the processes of steps S151 to S154, the user using the communication terminal on the receiving side is prevented from overlooking a material image to which the user using the communication terminal on the transmission side wants the user on the receiving side to pay attention.

Further, according to the present embodiment, the communication terminal such as the videoconference terminal 3*a* generates a spherical panoramic image and a predetermined-area image based on image type information associated with an image data ID transmitted with image data. This prevents the front-side hemispherical image and the back-side hemispherical image from being displayed as illustrated in FIG. 29A.

Further, according to the present embodiment, in a conference system or the like in which a receiver terminal superimposes a certain image (i.e., superimposition source image) on a part of another image (i.e., superimposition destination image), a user using a sender terminal can change a position where the superimposition source image is to be displayed in the superimposition destination image. Therefore, the embodiment described above can provide an image that is suitable for viewing and easy to recognize, by changing the superimposition position, in a case where a superimposition source image is superimposed at a position that is not intended by a user operating the sender terminal, or in a case where a user wants to superimpose the image at a different position during a conference.

In conventional techniques, since the predetermined-area image is an image of a predetermined area, which is a part of a whole image such as a spherical panoramic image, there is a case that the document image is not displayed on a display of the communication terminal on the receiving side even when the communication terminal on the receiving side displays the predetermined-area image. Therefore, the user using the other communication terminal on the receiving side can overlook the document image to which the user using the communication terminal on the transmission side wants the user on the receiving side to pay attention.

According to one or more embodiments of the present disclosure, the user using the other communication terminal on the receiving side is prevented from overlooking a document image to which the user using the communication terminal on the transmission side wants the user on the receiving side to pay attention.

In the above-described embodiment, a captured image (whole image) is a three-dimensional spherical panoramic image, as an example of a panoramic image, which is a destination image on which another image is to be superimposed. In another example, the captured image is a two-dimensional panoramic image. In addition, in this disclosure, the spherical image does not have to be a full-view spherical image. For example, the spherical image can be a wide-angle view image having an angle of about 180 to 360 degrees in the horizontal direction.

Further, in the above-described embodiments, the communication management system 5 transfers the predetermined-area information transmitted from each communication terminal. In another example, each communication terminal can directly transmit or receive the predetermined-area information from or to any one or more of the other communication terminals.

Each of the functions of the above-described embodiments may be implemented by one or more processing circuits or circuitry. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

What is claimed is:

1. A communication terminal that displays a predetermined-area image, the predetermined-area image being a part of a spherical image, the communication terminal comprising circuitry configured to:
   display, when a material image is included within the predetermine-area image, the spherical image and the material image with the spherical image and the material image being overlapped, each of the spherical image and the material image being transmitted from another communication terminal; and display the material image such that the material image is located at a predetermined position in the predetermined-area image, when at least a part of the material image is not included within the predetermine-area image.

2. The communication terminal of claim 1, wherein:

the circuitry is further configured to display the material image which is overlapped at an overlap position in the predetermined-area image, when at least a part of the material image is included within the predetermined-area image.

3. The communication terminal of claim 1, wherein:

the circuitry is further configured to display the material image which is at a set position in the predetermined-area image, when a part of the material image is not included within the predetermined-area image.

4. A method, comprising:

receiving from a communication terminal, a spherical image and a material image;

displaying, when the material image is included within a predetermine-area image, the spherical image and the material image with the spherical image and the material image being overlapped; and displaying the material image such that the material image is located at a predetermined position in the predetermined-area image, when at least a part of the material image is not included within the predetermine-area image.

5. The method of claim 4, wherein the displaying of the spherical image and the material image with the spherical image and the material image being overlapped comprises:

displaying the material image which is overlapped at an overlap position in the predetermined-area image, when at least a part of the material image is included within the predetermined-area image.

6. The communication terminal of claim 4, wherein the displaying of the material image comprises:

displaying the material image which is at a set position in the predetermined-area image, when a part of the material image is not included within the predetermined-area image.

* * * * *